US011544078B2

United States Patent
Wagner et al.

(10) Patent No.: US 11,544,078 B2
(45) Date of Patent: *Jan. 3, 2023

(54) SYSTEMS AND METHODS FOR DISTRIBUTED CONTROL

(71) Applicant: Axon Enterprise, Inc., Scottsdale, AZ (US)

(72) Inventors: Daniel J. Wagner, Scottsdale, AZ (US); Mark A. Hanchett, Mesa, AZ (US); Aaron J. Kloc, Scottsdale, AZ (US); Tyler J. Conant, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,720

(22) Filed: Jan. 25, 2021

(65) Prior Publication Data
US 2021/0247990 A1  Aug. 12, 2021

Related U.S. Application Data

(63) Continuation of application No. 16/508,105, filed on Jul. 10, 2019, now Pat. No. 10,901,754, which is a
(Continued)

(51) Int. Cl.
*G06F 9/445* (2018.01)
*G06F 13/10* (2006.01)
(Continued)

(52) U.S. Cl.
CPC ........ *G06F 9/44505* (2013.01); *G06F 13/102* (2013.01); *H04N 21/422* (2013.01);
(Continued)

(58) Field of Classification Search
CPC . G06F 9/44505; G06F 13/102; H04N 21/422; H04N 21/43615; H04N 21/43637; H04W 4/80; Y02D 10/00
(Continued)

(56) References Cited

U.S. PATENT DOCUMENTS 3,467,771 A  7/1969 Polack
4,326,221 A  4/1982 Mallos
(Continued)

FOREIGN PATENT DOCUMENTS

DE  102010019451 A1  11/2011
EP  522445 B1  12/1996
(Continued)

OTHER PUBLICATIONS

International Searching Authority, International Search Report for International Patent Application No. PCT/US2015/056490 dated Jan. 18, 2016.
(Continued)

*Primary Examiner* — Idriss N Alrobaye
*Assistant Examiner* — Henry W Yu
(74) *Attorney, Agent, or Firm* — Andrew Graham

(57) ABSTRACT

Systems involving distributed control functions are described herein. Each member or device within the system has responsibility for controlling part of the system's behavior, and includes logic to determine what action, if any, will follow as a response to determining information or receiving information from other members or devices within the system. A change of status of one member of a system may provide a basis for action by another member of the system. Status may be the result of sensing a condition of the environment, sensing the condition of a component, receiving the output of a conventional sensor, and/or sensing the condition of a link between components. In some embodi-
(Continued)

ments, action taken by a member of the system may include collecting data during law enforcement activities.

20 Claims, 13 Drawing Sheets

Related U.S. Application Data continuation of application No. 14/918,392, filed on Oct. 20, 2015, now Pat. No. 10,409,621.

(60) Provisional application No. 62/192,466, filed on Jul. 14, 2015, provisional application No. 62/066,083, filed on Oct. 20, 2014.

(51) Int. Cl.
  *H04N 21/422* (2011.01)
  *H04N 21/436* (2011.01)
  *H04N 21/4363* (2011.01)
  *H04W 4/80* (2018.01)

(52) U.S. Cl.
  CPC . *H04N 21/43615* (2013.01); *H04N 21/43637* (2013.01); *H04W 4/80* (2018.02); *Y02D 10/00* (2018.01)

(58) Field of Classification Search
  USPC ......... 710/8, 10, 15, 62; 370/389; 369/27.01
  See application file for complete search history.

(56) References Cited

U.S. PATENT DOCUMENTS

| | | |
|---|---|---|
| 4,409,670 A | 10/1983 | Herndon |
| 4,786,966 A | 11/1988 | Hanson |
| 4,789,904 A | 12/1988 | Peterson |
| 4,815,757 A | 3/1989 | Hamilton |
| 4,831,438 A | 5/1989 | Bellman |
| 4,863,130 A | 9/1989 | Marks |
| 4,910,591 A | 3/1990 | Petrossian |
| 4,978,473 A | 4/1990 | Blackshear |
| 4,926,495 A | 5/1990 | Comroe |
| 4,949,186 A | 8/1990 | Peterson |
| 5,012,335 A | 4/1991 | Cohodar |
| 5,027,104 A | 6/1991 | Reid |
| 5,096,287 A | 3/1992 | Kakinami |
| 5,111,289 A | 5/1992 | Lucas |
| 5,289,321 A | 2/1994 | Secor |
| 5,381,155 A | 1/1995 | Gerber |
| 5,400,185 A | 3/1995 | Scerbo |
| 5,420,725 A | 5/1995 | Hsu |
| 5,446,659 A | 8/1995 | Yamawaki |
| 5,448,320 A * | 9/1995 | Sakai ............... G08B 13/19619 396/427 |
| 5,453,939 A | 9/1995 | Hoffman |
| 5,473,729 A | 12/1995 | Bryant |
| 5,479,149 A | 12/1995 | Pike |
| 5,491,464 A | 2/1996 | Carter |
| 5,497,419 A | 3/1996 | Hill |
| 5,526,133 A | 6/1996 | Paff |
| 5,585,798 A | 12/1996 | Yoshioka |
| 5,636,122 A | 6/1997 | Shah |
| 5,642,285 A | 6/1997 | Woo |
| 5,659,289 A | 8/1997 | Zonkoski |
| 5,668,675 A | 9/1997 | Fredricks |
| D385,209 S | 10/1997 | Mercer |
| 5,689,442 A | 11/1997 | Swanson |
| 5,691,242 A | 11/1997 | Nomi et al. |
| 5,729,016 A | 3/1998 | Klapper |
| 5,742,336 A | 4/1998 | Lee |
| 5,752,632 A | 5/1998 | Sanderson |
| 5,781,243 A | 7/1998 | Kormos |
| 5,798,458 A | 8/1998 | Monroe |
| 5,815,093 A | 9/1998 | Kikinis |
| 5,834,676 A | 11/1998 | Elliot |
| 5,850,613 A | 12/1998 | Bullecks |
| 5,878,283 A | 3/1999 | House |
| 5,886,739 A | 3/1999 | Winningstad |
| 5,890,079 A | 3/1999 | Levine |
| 5,926,210 A | 7/1999 | Hackett |
| 5,978,017 A | 11/1999 | Tino |
| 5,983,161 A | 11/1999 | Lemelson |
| 5,996,023 A | 11/1999 | Winter |
| 6,008,841 A | 12/1999 | Charlson |
| 6,028,528 A | 2/2000 | Lorenzetti |
| 6,037,977 A | 3/2000 | Peterson |
| 6,052,068 A | 4/2000 | Price |
| 6,097,429 A | 8/2000 | Seeley |
| 6,100,806 A | 8/2000 | Gaukel |
| 6,121,881 A | 9/2000 | Bieback |
| 6,141,609 A | 10/2000 | Herdeg |
| 6,163,338 A | 12/2000 | Johnson |
| 6,175,300 B1 | 1/2001 | Kendrick |
| 6,215,518 B1 | 4/2001 | Watkins |
| 6,272,781 B1 | 8/2001 | Resnick |
| 6,292,213 B1 | 9/2001 | Jones |
| 6,298,290 B1 | 10/2001 | Abe |
| 6,310,541 B1 | 10/2001 | Atkins |
| 6,314,364 B1 | 11/2001 | Nakamura |
| 6,326,900 B2 | 12/2001 | Deline |
| 6,333,694 B2 | 12/2001 | Peirce |
| 6,333,759 B1 | 12/2001 | Mazzilli |
| 6,370,475 B1 | 4/2002 | Breed |
| RE37,709 E | 5/2002 | Dukek |
| 6,389,340 B1 | 5/2002 | Rayner |
| 6,396,403 B1 | 5/2002 | Haner |
| 6,405,112 B1 | 6/2002 | Rayner |
| 6,411,874 B2 | 6/2002 | Morgan |
| 6,449,540 B1 | 9/2002 | Rayner |
| 6,452,572 B1 | 9/2002 | Fan |
| 6,518,881 B2 | 2/2003 | Monroe |
| 6,525,672 B2 | 2/2003 | Chainer |
| 6,546,119 B2 | 4/2003 | Ciolli |
| 6,560,463 B1 | 5/2003 | Santhoff |
| 6,681,195 B1 | 1/2004 | Poland |
| 6,697,103 B1 | 2/2004 | Fernandez |
| 6,704,044 B1 | 3/2004 | Foster |
| 6,718,239 B2 | 4/2004 | Rayner |
| 6,727,816 B1 | 4/2004 | Helgeson |
| 6,748,792 B1 | 6/2004 | Freund |
| 6,784,833 B1 | 8/2004 | Evans |
| 6,795,111 B1 | 9/2004 | Mazzilli |
| RE38,626 E | 10/2004 | Kielland |
| 6,823,621 B2 | 11/2004 | Gotfried |
| 6,831,556 B1 | 12/2004 | Boykin |
| 6,856,873 B2 | 2/2005 | Breed |
| 6,894,717 B2 | 5/2005 | Bakewell |
| 6,950,122 B1 | 9/2005 | Mirabile |
| 6,955,484 B2 | 10/2005 | Woodman |
| 6,970,183 B1 | 11/2005 | Monroe |
| 7,012,632 B2 | 3/2006 | Freeman |
| 7,023,913 B1 | 4/2006 | Monroe |
| 7,034,683 B2 | 4/2006 | Ghazarian |
| 7,038,590 B2 | 5/2006 | Hoffman |
| 7,106,835 B2 | 9/2006 | Saalsaa |
| D529,528 S | 10/2006 | Ross |
| 7,116,357 B1 | 10/2006 | Oya |
| 7,119,832 B2 | 10/2006 | Blanco |
| 7,126,472 B2 | 10/2006 | Kraus |
| 7,147,155 B2 | 12/2006 | Weekes |
| 7,180,407 B1 | 2/2007 | Guo |
| 7,190,882 B2 | 3/2007 | Gammenthaler |
| 7,273,321 B2 | 9/2007 | Woodman |
| 7,298,964 B2 | 11/2007 | Ishikawa |
| 7,359,553 B1 | 4/2008 | Wendt |
| 7,371,021 B2 | 5/2008 | Ross |
| 7,432,972 B2 | 10/2008 | Storm |
| 7,436,955 B2 | 10/2008 | Yan |
| 7,448,996 B2 | 11/2008 | Khanuja |
| 7,456,875 B2 | 11/2008 | Kashiwa |
| 7,458,736 B2 | 12/2008 | Woodman |
| 7,463,280 B2 | 12/2008 | Steuart |
| 7,488,996 B2 | 2/2009 | Chang |

(56) References Cited

U.S. PATENT DOCUMENTS

| | | |
|---|---|---|
| 7,496,140 B2 | 2/2009 | Winningstad |
| 7,500,794 B1 | 3/2009 | Clark |
| 7,508,941 B1 | 3/2009 | O'Toole |
| 7,519,271 B2 | 4/2009 | Strub |
| 7,536,457 B2 | 5/2009 | Miller |
| 7,539,533 B2 | 5/2009 | Tran |
| 7,561,037 B1 | 7/2009 | Monroe |
| 7,576,800 B2 | 8/2009 | Swain |
| 7,593,034 B2 | 9/2009 | Dekeyser |
| 7,599,942 B1 | 10/2009 | Mohamad |
| 7,602,301 B1 | 10/2009 | Stirling |
| 7,659,827 B2 | 2/2010 | Gunderson |
| 7,680,947 B2 | 3/2010 | Nicholl |
| 7,685,428 B2 | 3/2010 | Piersol |
| 7,697,035 B1 | 4/2010 | Suber |
| 7,711,154 B2 | 5/2010 | Danielson |
| D616,901 S | 6/2010 | Ward |
| 7,742,625 B2 | 6/2010 | Pilu |
| 7,756,602 B2 | 7/2010 | Koempel |
| 7,804,426 B2 | 9/2010 | Etcheson |
| 7,806,525 B2 | 10/2010 | Howell |
| 7,853,944 B2 | 12/2010 | Choe |
| 7,881,604 B2 | 2/2011 | Kurane |
| 8,005,937 B2 | 8/2011 | Wesley |
| D644,679 S | 9/2011 | Woodman |
| 8,014,597 B1 | 9/2011 | Newman |
| D646,313 S | 10/2011 | Woodman |
| 8,063,786 B2 | 11/2011 | Manotas |
| 8,063,934 B2 | 11/2011 | Donato |
| 8,077,029 B1 | 12/2011 | Daniel |
| 8,079,501 B2 | 12/2011 | Woodman |
| 8,081,214 B2 | 12/2011 | Vanman |
| D657,808 S | 4/2012 | Woodman |
| 8,150,248 B1 | 4/2012 | Woodman |
| 8,175,314 B1 | 5/2012 | Webster |
| 8,176,093 B2 | 5/2012 | Mohamad |
| 8,228,364 B2 | 7/2012 | Cilia |
| 8,269,617 B2 | 9/2012 | Cook |
| 8,314,708 B2 | 11/2012 | Gunderson |
| 8,325,270 B2 | 12/2012 | Woodman |
| D674,428 S | 1/2013 | Woodman |
| D674,429 S | 1/2013 | Woodman |
| 8,345,969 B2 | 1/2013 | Newman |
| 8,350,907 B1 | 1/2013 | Blanco |
| 8,351,447 B2 | 1/2013 | Habuto |
| 8,373,567 B2 | 2/2013 | Denson |
| 8,384,539 B2 | 2/2013 | Denny |
| 8,433,763 B2 | 4/2013 | Anderson |
| 8,456,293 B1 | 6/2013 | Trundle |
| 8,472,061 B2 * | 6/2013 | Miyazawa ............ G06F 3/1288 358/1.15 |
| 8,479,009 B2 | 7/2013 | Bennett |
| 8,487,995 B2 | 7/2013 | Vanman |
| 8,503,972 B2 | 8/2013 | Haler |
| 8,508,353 B2 | 8/2013 | Cook |
| 8,520,069 B2 | 8/2013 | Haler |
| D689,537 S | 9/2013 | Campbell |
| 8,451,903 B2 | 9/2013 | Burk |
| 8,538,143 B2 | 9/2013 | Newman |
| D692,472 S | 10/2013 | Samuels |
| 8,571,895 B1 | 10/2013 | Medina |
| 8,606,073 B2 | 12/2013 | Woodman |
| 8,606,492 B1 | 12/2013 | Botnen |
| 8,629,977 B2 | 1/2014 | Phillips |
| 8,638,392 B2 | 1/2014 | Woodman |
| D699,275 S | 2/2014 | Samuels |
| D699,276 S | 2/2014 | Samuels |
| D699,277 S | 2/2014 | Samuels |
| 8,644,629 B2 | 2/2014 | Newman |
| 8,676,728 B1 | 3/2014 | Richardson |
| D702,276 S | 4/2014 | Woodman |
| D702,277 S | 4/2014 | Woodman |
| D702,747 S | 4/2014 | Woodman |
| D702,754 S | 4/2014 | Bould |
| D702,755 S | 4/2014 | Bould |
| 8,700,946 B2 | 4/2014 | Reddy |
| 8,707,758 B2 | 4/2014 | Keays |
| 8,718,390 B1 | 5/2014 | Newman |
| 8,725,462 B2 | 5/2014 | Jain |
| 8,744,642 B2 | 6/2014 | Neman-Nasser |
| 8,781,292 B1 | 7/2014 | Ross |
| 8,827,869 B2 | 9/2014 | Ellis |
| 8,836,784 B2 | 9/2014 | Erhardt |
| 8,837,928 B1 | 9/2014 | Clearman |
| 8,849,501 B2 | 9/2014 | Cook |
| D715,347 S | 10/2014 | Troxel |
| D715,846 S | 10/2014 | Troxel |
| 8,854,199 B2 | 10/2014 | Cook |
| 8,854,465 B1 | 10/2014 | Mcintyre |
| 8,857,775 B1 | 10/2014 | Clearman |
| 8,863,208 B2 | 10/2014 | Calvert |
| 8,867,886 B2 | 10/2014 | Feinson |
| 8,872,916 B2 | 10/2014 | Alberth |
| 8,872,940 B2 | 10/2014 | Marman |
| 8,887,208 B1 | 11/2014 | Merrit |
| 8,893,010 B1 | 11/2014 | Brin |
| 8,896,432 B2 | 11/2014 | Kang |
| 8,897,506 B2 | 11/2014 | Myers |
| 8,911,162 B2 | 12/2014 | Kuehl |
| 8,914,472 B1 | 12/2014 | Lee |
| 8,923,998 B2 | 12/2014 | Ellis |
| 8,928,752 B2 | 1/2015 | Dekeyser |
| 8,930,072 B1 | 1/2015 | Lambert |
| 8,934,015 B1 | 1/2015 | Chi |
| 8,947,262 B2 | 2/2015 | Rauscher |
| 8,964,014 B2 | 2/2015 | Ollila |
| 8,989,914 B1 | 3/2015 | Nemat-Nasser |
| 8,996,234 B1 | 3/2015 | Tamari |
| 9,041,803 B2 | 5/2015 | Chen |
| 9,143,670 B1 | 9/2015 | Cilia |
| 9,148,585 B2 | 9/2015 | Cragun |
| 9,183,679 B2 | 11/2015 | Plante |
| 9,204,084 B2 | 12/2015 | Kim |
| 9,214,191 B2 | 12/2015 | Guzik |
| 9,237,262 B2 | 1/2016 | Phillips |
| 9,253,452 B2 | 2/2016 | Ross |
| 2002/0013517 A1 | 1/2002 | West |
| 2002/0032510 A1 | 3/2002 | Turnbull |
| 2002/0044065 A1 | 4/2002 | Quist |
| 2002/0049881 A1 | 4/2002 | Sugimura |
| 2002/0084130 A1 | 7/2002 | Der Ghazarian |
| 2002/0131768 A1 | 9/2002 | Gammenthaler |
| 2002/0135336 A1 | 9/2002 | Zhou |
| 2002/0159434 A1 | 10/2002 | Gosior |
| 2002/0191952 A1 | 12/2002 | Fiore |
| 2003/0040917 A1 | 2/2003 | Fiedler |
| 2003/0080878 A1 | 5/2003 | Kirmuss |
| 2003/0081121 A1 | 5/2003 | Kirmuss |
| 2003/0081123 A1 | 5/2003 | Rupe |
| 2003/0090572 A1 | 5/2003 | Belz |
| 2003/0106917 A1 | 5/2003 | Melnyk |
| 2003/0151663 A1 | 8/2003 | Lorenzetti |
| 2003/0173408 A1 | 9/2003 | Mosher |
| 2003/0184649 A1 | 10/2003 | Mann |
| 2003/0215010 A1 | 11/2003 | Kashiwa |
| 2003/0215114 A1 | 11/2003 | Kyle |
| 2003/0222982 A1 | 12/2003 | Hamdan |
| 2004/0013192 A1 | 1/2004 | Kennedy |
| 2004/0033058 A1 | 2/2004 | Reich |
| 2004/0043765 A1 | 3/2004 | Tolhurst |
| 2004/0061780 A1 | 4/2004 | Huffman |
| 2004/0088413 A1 | 5/2004 | Bhogi et al. |
| 2004/0145457 A1 | 7/2004 | Schofield |
| 2004/0146272 A1 | 7/2004 | Kessel |
| 2004/0164896 A1 | 8/2004 | Evans |
| 2004/0168002 A1 | 8/2004 | Accarie |
| 2004/0199785 A1 | 10/2004 | Pederson |
| 2004/0208493 A1 | 10/2004 | Kashiwa |
| 2004/0223054 A1 | 11/2004 | Rotholtz |
| 2004/0263609 A1 | 12/2004 | Otsuki |
| 2005/0030151 A1 | 2/2005 | Singh |
| 2005/0035161 A1 | 2/2005 | Shioda |
| 2005/0046583 A1 | 3/2005 | Richards |
| 2005/0066371 A1 | 3/2005 | Lu |

(56) References Cited

U.S. PATENT DOCUMENTS

| | | |
|---|---|---|
| 2005/0068169 A1 | 3/2005 | Copley |
| 2005/0068171 A1 | 3/2005 | Kelliher |
| 2005/0078195 A1 | 4/2005 | Vanwagner |
| 2005/0078672 A1* | 4/2005 | Caliskan ............... H04W 28/02 370/389 |
| 2005/0083404 A1 | 4/2005 | Peirce |
| 2005/0088521 A1 | 4/2005 | Blanco |
| 2005/0094966 A1 | 5/2005 | Lao |
| 2005/0131993 A1 | 6/2005 | Fatula, Jr. |
| 2005/0134710 A1 | 6/2005 | Nomura |
| 2005/0134966 A1 | 6/2005 | Burgner |
| 2005/0167172 A1 | 8/2005 | Fernandez |
| 2005/0188087 A1 | 8/2005 | Iyoda |
| 2005/0206532 A1 | 9/2005 | Lock |
| 2005/0206741 A1 | 9/2005 | Raber |
| 2005/0228234 A1 | 10/2005 | Yang |
| 2005/0232469 A1 | 10/2005 | Schofield |
| 2006/0009238 A1 | 1/2006 | Stanco |
| 2006/0012683 A9 | 1/2006 | Lao |
| 2006/0015898 A1* | 1/2006 | Kim ........................ H04N 7/08 725/33 |
| 2006/0028811 A1 | 2/2006 | Ross |
| 2006/0055521 A1 | 3/2006 | Blanco |
| 2006/0133476 A1 | 6/2006 | Page |
| 2006/0158938 A1 | 7/2006 | Vanman |
| 2006/0158968 A1* | 7/2006 | Vanman ........... G11B 20/00471 369/27.01 |
| 2006/0164220 A1 | 7/2006 | Harter |
| 2006/0164534 A1 | 7/2006 | Robinson |
| 2006/0170770 A1 | 8/2006 | Maccarthy |
| 2006/0176149 A1 | 8/2006 | Douglas |
| 2006/0183505 A1 | 8/2006 | Willrich |
| 2006/0203090 A1 | 9/2006 | Wang |
| 2006/0220826 A1 | 10/2006 | Rast |
| 2006/0244601 A1 | 11/2006 | Nishimura |
| 2006/0256822 A1 | 11/2006 | Kwong |
| 2006/0270465 A1 | 11/2006 | Lee |
| 2006/0274828 A1 | 12/2006 | Siemens |
| 2006/0282021 A1 | 12/2006 | Devaul |
| 2006/0287821 A1 | 12/2006 | Lin |
| 2006/0293571 A1 | 12/2006 | Bao |
| 2007/0021134 A1 | 1/2007 | Liou |
| 2007/0039030 A1 | 2/2007 | Romanowich |
| 2007/0064108 A1 | 3/2007 | Haler |
| 2007/0067079 A1 | 3/2007 | Kosugi |
| 2007/0102508 A1 | 5/2007 | Mcintosh |
| 2007/0117083 A1 | 5/2007 | Winneg |
| 2007/0132567 A1 | 6/2007 | Schofield |
| 2007/0152811 A1 | 7/2007 | Anderson |
| 2007/0172053 A1 | 7/2007 | Poirier |
| 2007/0177023 A1 | 8/2007 | Beuhler |
| 2007/0200914 A1 | 8/2007 | Dumas |
| 2007/0217761 A1 | 9/2007 | Chen |
| 2007/0222859 A1 | 9/2007 | Chang |
| 2007/0229350 A1 | 10/2007 | Scalisi |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0257987 A1 | 11/2007 | Wang |
| 2007/0260361 A1 | 11/2007 | Etcheson |
| 2007/0268158 A1 | 11/2007 | Gunderson |
| 2007/0271105 A1 | 11/2007 | Gunderson |
| 2007/0274705 A1 | 11/2007 | Kashiwa |
| 2007/0285222 A1 | 12/2007 | Zadnikar |
| 2007/0287425 A1 | 12/2007 | Bates |
| 2007/0293186 A1 | 12/2007 | Lehmann |
| 2007/0297320 A1 | 12/2007 | Brummette |
| 2008/0001735 A1 | 1/2008 | Tran |
| 2008/0002599 A1 | 1/2008 | Yau |
| 2008/0004055 A1* | 1/2008 | Yannay ............. H04W 36/0011 455/466 |
| 2008/0030580 A1 | 2/2008 | Kashiwa |
| 2008/0042825 A1 | 2/2008 | Denny |
| 2008/0043736 A1 | 2/2008 | Stanley |
| 2008/0049831 A1 | 2/2008 | Richardson |
| 2008/0063252 A1 | 3/2008 | Dobbs |
| 2008/0100705 A1 | 5/2008 | Kister |
| 2008/0122603 A1 | 5/2008 | Plante |
| 2008/0126804 A1* | 5/2008 | Zhang ................... H04L 9/3297 713/169 |
| 2008/0127160 A1 | 5/2008 | Rackin |
| 2008/0129518 A1 | 6/2008 | Carlton-Foss |
| 2008/0211906 A1 | 9/2008 | Lovric |
| 2008/0234934 A1 | 9/2008 | Otani |
| 2008/0239064 A1 | 10/2008 | Iwasaki |
| 2008/0246656 A1 | 10/2008 | Ghazarian |
| 2008/0266118 A1 | 10/2008 | Pierson |
| 2009/0002491 A1 | 1/2009 | Haler |
| 2009/0002556 A1 | 1/2009 | Manapragada |
| 2009/0021591 A1 | 1/2009 | Sako |
| 2009/0027061 A1* | 1/2009 | Curt ....................... G01R 31/58 324/539 |
| 2009/0027499 A1 | 1/2009 | Nicholl |
| 2009/0070820 A1 | 3/2009 | Li |
| 2009/0122142 A1 | 3/2009 | Li |
| 2009/0085740 A1 | 4/2009 | Klein |
| 2009/0141129 A1 | 6/2009 | Dischinger |
| 2009/0169068 A1 | 7/2009 | Okamoto |
| 2009/0207252 A1 | 8/2009 | Raghunath |
| 2009/0213204 A1 | 8/2009 | Wong |
| 2009/0243794 A1 | 10/2009 | Morrow |
| 2009/0252486 A1 | 10/2009 | Ross |
| 2009/0273672 A1 | 11/2009 | Koudritski |
| 2009/0276531 A1 | 11/2009 | Myka |
| 2009/0290022 A1 | 11/2009 | Uhm |
| 2010/0060734 A1 | 3/2010 | Chou |
| 2010/0077437 A1 | 3/2010 | Mcmanus |
| 2010/0113072 A1* | 5/2010 | Gibson .................. H04W 4/12 455/466 |
| 2010/0177891 A1 | 7/2010 | Keidar |
| 2010/0188201 A1 | 7/2010 | Cook |
| 2010/0191411 A1 | 7/2010 | Cook |
| 2010/0238262 A1 | 9/2010 | Kurtz |
| 2010/0242076 A1 | 9/2010 | Potesta |
| 2010/0250021 A1 | 9/2010 | Cook |
| 2010/0265331 A1 | 10/2010 | Tanaka |
| 2010/0279649 A1 | 11/2010 | Thomas |
| 2010/0328463 A1 | 12/2010 | Haler |
| 2011/0006151 A1 | 1/2011 | Beard |
| 2011/0069151 A1 | 1/2011 | Orimoto |
| 2011/0030016 A1* | 2/2011 | Pino, Jr. ............. H04N 21/6131 725/80 |
| 2011/0084820 A1 | 4/2011 | Walter |
| 2011/0094003 A1 | 4/2011 | Spiewak |
| 2011/0128350 A1 | 6/2011 | Oliver |
| 2011/0145191 A1 | 6/2011 | Anderson |
| 2011/0261176 A1 | 10/2011 | Monaghan |
| 2011/0267433 A1 | 11/2011 | Thorpe |
| 2012/0038689 A1 | 2/2012 | Ishii |
| 2012/0056722 A1 | 3/2012 | Kawaguchi |
| 2012/0063736 A1 | 3/2012 | Simmons |
| 2012/0127315 A1 | 5/2012 | Heier |
| 2012/0162436 A1 | 6/2012 | Cordell |
| 2012/0189286 A1 | 7/2012 | Takayama |
| 2012/0259852 A1 | 10/2012 | Aasen |
| 2012/0268259 A1 | 10/2012 | Igel |
| 2012/0276954 A1 | 11/2012 | Kowalsky |
| 2013/0021153 A1 | 1/2013 | Keays |
| 2013/0027552 A1 | 1/2013 | Guzik |
| 2013/0039157 A1 | 2/2013 | Waites |
| 2013/0076531 A1* | 3/2013 | San Vicente ....... A61B 5/14532 340/870.02 |
| 2013/0080836 A1 | 3/2013 | Stergiou |
| 2013/0080841 A1 | 3/2013 | Reddy |
| 2013/0096731 A1 | 4/2013 | Tamari |
| 2013/0096733 A1 | 4/2013 | Manotas |
| 2013/0147962 A1 | 6/2013 | Siann |
| 2013/0156397 A1 | 6/2013 | Chen |
| 2013/0198637 A1 | 8/2013 | Childers |
| 2013/0209057 A1 | 8/2013 | Ofir |
| 2013/0222640 A1 | 8/2013 | Baek |
| 2013/0242262 A1 | 9/2013 | Lewis |
| 2013/0263122 A1 | 10/2013 | Levijarvi |

(56) References Cited

U.S. PATENT DOCUMENTS

| | | |
|---|---|---|
| 2013/0282919 A1 | 10/2013 | Richards |
| 2013/0314537 A1 | 11/2013 | Haler |
| 2013/0318391 A1* | 11/2013 | Kazemi .............. G06F 3/061 714/6.11 |
| 2013/0336627 A1 | 12/2013 | Calvert |
| 2013/0342697 A1 | 12/2013 | Haler |
| 2014/0007107 A1* | 1/2014 | Nachum ............. G06F 9/4843 718/100 |
| 2014/0009585 A1 | 1/2014 | Campbell |
| 2014/0028818 A1 | 1/2014 | Brockway |
| 2014/0037262 A1 | 2/2014 | Sako |
| 2014/0043485 A1 | 2/2014 | Bateman |
| 2014/0049636 A1 | 2/2014 | O'Donnell |
| 2014/0063249 A1 | 3/2014 | Miller |
| 2014/0073252 A1 | 3/2014 | Lee et al. |
| 2014/0092251 A1 | 4/2014 | Troxel |
| 2014/0092299 A1 | 4/2014 | Phillips |
| 2014/0094992 A1 | 4/2014 | Lambert |
| 2014/0101453 A1 | 4/2014 | Senthurpandi |
| 2014/0104488 A1 | 4/2014 | Samuels |
| 2014/0105589 A1 | 4/2014 | Samuels |
| 2014/0122721 A1 | 5/2014 | Marocchi |
| 2014/0125966 A1 | 5/2014 | Phillips |
| 2014/0136445 A1 | 5/2014 | Thorgerson |
| 2014/0156833 A1 | 6/2014 | Robinson |
| 2014/0160250 A1 | 6/2014 | Pomerantz |
| 2014/0167954 A1* | 6/2014 | Johnson ............. G08B 27/001 340/539.11 |
| 2014/0169752 A1 | 6/2014 | Johnson |
| 2014/0187190 A1 | 7/2014 | Schuler |
| 2014/0195105 A1 | 7/2014 | Lambert |
| 2014/0199041 A1 | 7/2014 | Blanco |
| 2014/0210625 A1 | 7/2014 | Nemat-Nasser |
| 2014/0211962 A1 | 7/2014 | Davis |
| 2014/0215885 A1* | 8/2014 | Sullivan ............. G07C 9/00896 42/84 |
| 2014/0227671 A1 | 8/2014 | Olmstead |
| 2014/0257539 A1 | 9/2014 | Vock |
| 2014/0267615 A1 | 9/2014 | Tapia |
| 2014/0267775 A1 | 9/2014 | Lablans |
| 2014/0267894 A1 | 9/2014 | Campbell |
| 2014/0270685 A1 | 9/2014 | Letke |
| 2014/0294257 A1 | 10/2014 | Tussy |
| 2014/0300739 A1 | 10/2014 | Mirmar |
| 2014/0305024 A1 | 10/2014 | Russell |
| 2014/0307981 A1 | 10/2014 | Rauscher |
| 2014/0311215 A1 | 10/2014 | Keays |
| 2014/0313341 A1 | 10/2014 | Stribling |
| 2014/0317052 A1 | 10/2014 | Goldstein |
| 2014/0321541 A1 | 10/2014 | Klein |
| 2014/0327928 A1 | 11/2014 | Monroe |
| 2014/0347265 A1 | 11/2014 | Aimone |
| 2014/0351217 A1 | 11/2014 | Bostock |
| 2014/0361185 A1 | 12/2014 | Howell |
| 2014/0368601 A1 | 12/2014 | Decharms |
| 2014/0375807 A1 | 12/2014 | Muetzel |
| 2014/0376872 A1 | 12/2014 | Lipetz |
| 2015/0002898 A1 | 1/2015 | Monroe |
| 2015/0015715 A1 | 1/2015 | Gloger |
| 2015/0021451 A1 | 1/2015 | Clearman |
| 2015/0030320 A1 | 1/2015 | Clearman |
| 2015/0051502 A1 | 2/2015 | Ross |
| 2015/0063776 A1 | 3/2015 | Ross |
| 2015/0078727 A1 | 3/2015 | Ross |
| 2015/0086175 A1* | 3/2015 | Lorenzetti ............ H04N 9/8211 386/226 |
| 2015/0088335 A1 | 3/2015 | Lambert |
| 2015/0100737 A1* | 4/2015 | Kessler .............. G06F 9/30043 711/135 |
| 2015/0103246 A1 | 4/2015 | Phillips |
| 2015/0222817 A1 | 8/2015 | Broadway |
| 2015/0237252 A1 | 8/2015 | O'Donnell |
| 2016/0173832 A1 | 6/2016 | Stewart |
| 2017/0241727 A1 | 8/2017 | Stewart |
| 2017/0241728 A1 | 8/2017 | Stewart |
| 2018/0274876 A1 | 9/2018 | Stewart |

FOREIGN PATENT DOCUMENTS

| | | |
|---|---|---|
| EP | 1868381 A1 | 12/2007 |
| EP | 2109074 A1 | 10/2009 |
| GB | 2273624 A | 6/1994 |
| GB | 2320389 A | 6/1998 |
| GB | 2351055 A | 12/2000 |
| GB | 2343252 B | 4/2003 |
| GB | 2417151 A | 2/2006 |
| GB | 2425427 A | 10/2006 |
| GB | 2455885 B | 3/2010 |
| GB | 2485804 A | 5/2012 |
| JP | H08-153298 A | 11/1996 |
| JP | 2000137263 A | 5/2005 |
| RU | 2383915 C2 | 3/2010 |
| WO | 1990005076 A1 | 5/1990 |
| WO | 1998031146 A1 | 7/1997 |
| WO | 1997038526 A1 | 10/1997 |
| WO | 2000039556 A1 | 7/2000 |
| WO | 2000051360 A1 | 8/2000 |
| WO | 2002049881 A1 | 6/2002 |
| WO | 2002095757 A2 | 11/2002 |
| WO | 2003049446 A1 | 6/2003 |
| WO | 2004036926 A2 | 4/2004 |
| WO | 2013/175741 A1 | 11/2013 |
| WO | 2014000161 A1 | 1/2014 |
| WO | 2014052898 A1 | 4/2014 |
| WO | 2015122129 A1 | 8/2015 |
| WO | 2016014724 A1 | 1/2016 |

OTHER PUBLICATIONS

Zepcam Wearable Video Technology; http://zepcam.com/product.aspx; Date printed: Feb. 21, 2016, Date posted: Unknown; p. 1.

Zepcam T1 Product Overview, Date Printed: Feb. 21, 2016; Date Published: Unknown; pp. 1-4.

The Wolfcom 3rd Eye Police Body Camera; http://wolfcomusa.com/wolfcom_3rd_eye_police_body_camera.html; Date Printed: Feb. 19, 2016; Date Posted: Unknown; pp. 1-25.

The New Wolfcom Vision Pro Police Body Worn Camera; http://www.wolfcomusa.com/wolfcom_vision_police_body_worn.html; Date Printed: Feb. 19, 2016; Date Posted: unknown; pp. 1-25.

Watchgaurd Vista Body-Worn Camera Brochure; http://watchguardvideo.com/vista/overview; Date Printed: Feb. 19, 2016; Date Posted: unknown; pp. 1-20.

The Safariland Group, Vievu Cameras, http://www.vievu/com/vievu-products/hardware/; Date Printed: Feb. 19, 2016; Date Posted: Unknown; pp. 1-5.

Digital Ally Body Worn Cameras; http://digitalallyinc.com/bodyworncameras.cfm; Date Printed: Feb. 19, 2016; Date Posted: Unknown; pp. 1-8.

Digital Ally Software; http://www.digitalallyinc.com/software/cfm; Date Printed: Feb. 19, 2016; Date Posted: Unknown; pp. 1-16.

Larson, Soleymani, Serdyukov, Automatic Tagging and Geo-tagging in Video Collections and Communities; Apr. 17-20, 2011, ICMR, Trento, Italy.

Iphone Video Metadata, CSI Tech; http://www.csitech.co.ukliphone-video-metadata/; Date Printed: Mar. 3, 2015; Date Posted: Unknown; pp. 1-3.

Ocean Systems Quick DME—Digital Media Evidence Manager Brochure; http://www.oceansystems.com/forensic/digital_evidence_property_room/index.php; Date Printed: Feb. 21, 2016; Date Posted: Unknown; pp. 1-2.

Activists' Guide To Archiving Videos, Acquire: Acquiring Raw Video and Metadata; http://archiveguide.witness/org/acquire/acquiring-raw-video-and-metadata; Date Printed: Mar. 3, 2015; Date Posted: Unknown; pp. 1-3.

Google Developeres Guide, YouTube Data API, Implementing OAuth 2.0 Authorization; http://developers.google.com/youtube/v3/guides/authentication; Date Printed: Mar. 3, 2015; Date Posted: Unknown; pp. 1-6.

(56) References Cited

OTHER PUBLICATIONS

Canadian Patent Office, Canadian Office Action for Canadian Patent Application No. 2964772 dated Jan. 29, 2019.
Burris, Jack A. "Officer Data Recording and Location System," Feb. 27, 2001, Motorola Inc. Found at https://ip.com/IPCOM/000004598. (Year: 2001).
European Patent Office, Communication Pursuant to Article 94(3) EPC for European Application No. 15797493.2 dated Nov. 26, 2021.
Taiwan Intellectual Property Office, Search Report for Taiwan Invention Patent Application No. 10413435 dated Mar. 6, 2017.

\* cited by examiner

SYSTEMS AND METHODS FOR DISTRIBUTED CONTROL

CROSS-REFERENCES TO RELATED APPLICATIONS

This application is a continuation of U.S. application Ser. No. 16/508,105, filed Jul. 10, 2019, which is a continuation of U.S. application Ser. No. 14/918,392, filed Oct. 20, 2015, which claims the benefit of Provisional Application No. 62/066,083, filed Oct. 20, 2014, and Provisional Application No. 62/192,466, filed Jul. 14, 2015, the entire disclosures of which are hereby incorporated by reference herein.

BACKGROUND

Existing techniques for controlling devices in a system, such as wearable cameras operating in a law enforcement context, have various shortcomings. For example, some existing systems require a recording state of a camera to be manually changed by its user. This can lead to video not being recorded for important incidents because a user is too distracted by urgent events that require attention to operate the camera, or for other reasons. What is needed are effective systems and methods for distributed control of wearable cameras and other controllable devices that do not require manual control by a user, but instead allow settings on the controllable devices to be changed in response to events that can automatically be detected.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system comprising a first peripheral device and a controllable device is provided. The first peripheral device is configured to broadcast a first notification indicating an availability of first information generated by the first peripheral device, and to transmit the first information in response to a request for the first information. The controllable device is configured to receive the first notification from the first peripheral device; in response to the first notification, transmit a request for the first information to the first peripheral device; and in response to the first information received from the first peripheral device, change at least one setting of the controllable device based on the first information.

In some embodiments, a controllable device is provided. The controllable device comprises a short-range wireless interface and a notification processing engine. The notification processing engine is configured to receive a first notification from a first peripheral device via the short-range wireless interface; and in response to a determination that the controllable device should process the first notification, change at least one setting of the controllable device based on the first notification.

In some embodiments, a method of processing received signals for control of a controllable device is provided. The method comprises receiving, by the controllable device, a first notification from a first peripheral device; and in response to determining that the controllable device should process the first notification, changing at least one setting of the controllable device based on the first notification.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In a system involving central control functions, the central (or federated) part of the system issues commands to other parts of the system and those parts take action in accordance with the received commands. The part that makes decisions and issues commands may be referred to as the master. The part or parts that perform commands may be referred to as slaves. By contrast, in a system involving distributed control functions such as the systems described herein, each member or device within the system that has responsibility for controlling part of the system's behavior includes logic to determine what action, if any, will follow as a response to determining information (e.g., passage of time, results of computation) or receiving information (e.g., one or more notice(s) of change(s) in status(es)). In systems that involve distributed control functions, a change of status of one member of a system may provide a basis for action by another member of the system. Status may be the result of sensing a condition of the environment, sensing the condition of a component, receiving the output of a conventional sensor, and/or sensing the condition of a link between components. When a member of a system receives an indication that status has changed, action taken in response may be determined by logic implemented in that member of the system.

A condition of a component may include a physical condition including but not limited to temperature, physical location or movement, configuration, capacity to perform, response time, forecast of capability, operating mode, faults encountered, inputs received, received messages, and results of computation. A condition of a link between components may include but is not limited to an operating electrical parameter, a description of establishing connection, a disconnection, a mode of communication, a network capacity, a latency, a description of a queue or buffer, a description of message routing, an extent of noise, a time allotment, and a description of a node (e.g., control, dormant, active, in range).

In some embodiments, recorded data is collected during law enforcement activities (e.g., traffic stops, incidents where police are dispatched to investigate or enforce the law, unmanned traffic monitoring). This class of embodiments will be used below to describe systems, methods, and communication that may be implemented in an analogous manner in a system used for other purposes, for example, any quantity of users who desire to record data during their chosen activities (e.g., first responders, surgical teams, sports teams, military operatives, security officers, social event managers, news reporting, film production, music production, classroom instruction, consumer surveys, group interviews). An officer is a user as discussed below.

Figure 1:
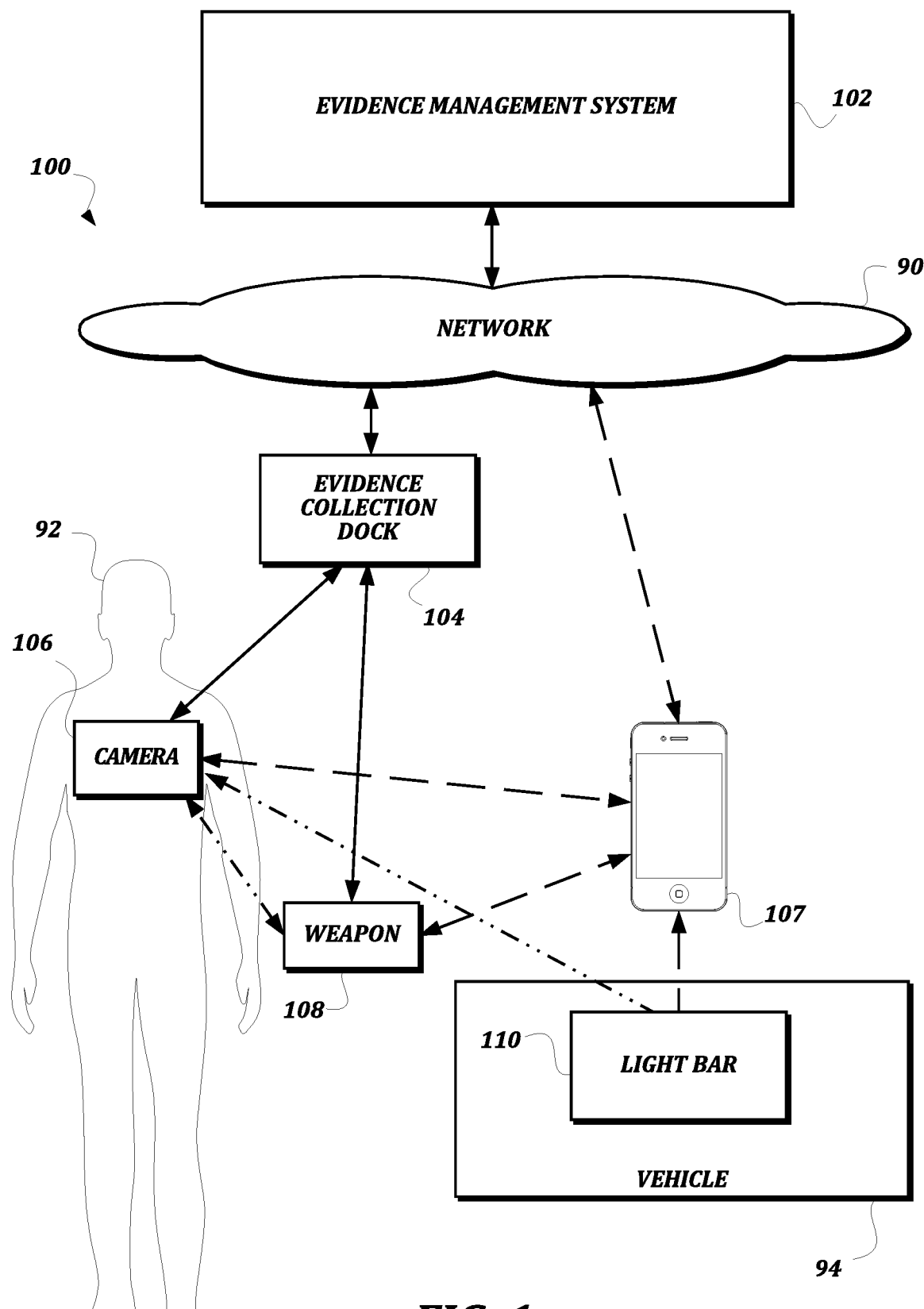
FIG. 1 is a high-level schematic diagram that illustrates communication between various components of an exemplary embodiment of a system according to various aspects of the present disclosure.

FIG. 1 is a high-level schematic diagram that illustrates communication between various components of an exemplary embodiment of a system according to various aspects of the present disclosure. In some embodiments, the system 100 is configured to allow for distributed control of various devices within the system 100.

In general, a user 92, such as a law enforcement officer, may be associated with one or more devices. The devices may include, but are not limited to, a camera 106, a weapon 108, and various devices associated with a vehicle 94 such as a light bar device 110. The camera 106 may be, for example, a wearable camera that records video and/or audio data when activated. The weapon 108 may be, for example, a conducted energy weapon (CEW) that transmits notifications regarding events such as firing events, cartridge loading, holster removal, and/or the like. The light bar device 110 may detect changes in state such as activation of the light bar on the vehicle 94, which is usually associated with an emergency situation. Other devices, such as a dashboard camera, a heart rate sensor device, a holster sensor device, and/or the like may also be included in the system 100 but are not illustrated in FIG. 1.

In some embodiments, at least some of the devices may have limited communication functionality. For example, devices may have short-range wireless communication abilities, but some devices may only be able to perform a direct long-range transmission or reception of information, such as to an evidence management system 102, when physically connected to an evidence collection dock 104 that communicates with the evidence management system 102 via a broadband network 90 such as a LAN, a WAN, and/or the Internet. Accordingly, technical problems arise when attempting to control the devices in an automated manner, at least in that no reliable communication path from a central control device to the controllable devices is available. In some embodiments, a personal assistant computing device 107 is provided. The personal assistant computing device 107 is illustrated as a smartphone computing device, but in some embodiments may be a laptop computing device, a tablet computing device, or any other suitable computing device capable of being carried by the user 92 or a vehicle 94 associated with the user 92 and capable of performing the actions described herein. The personal assistant computing device 107 may be capable of short-range communication with the other devices in the system 100, and may also be capable of long range communication with the evidence management system 102, a dispatch system, or any other system. In some embodiments, the personal assistant computing device 107 has the components and capabilities of a peripheral device 706 and/or a controllable device 702 as discussed below. Further aspects of these devices and their capabilities will be discussed below.

Figure 2:
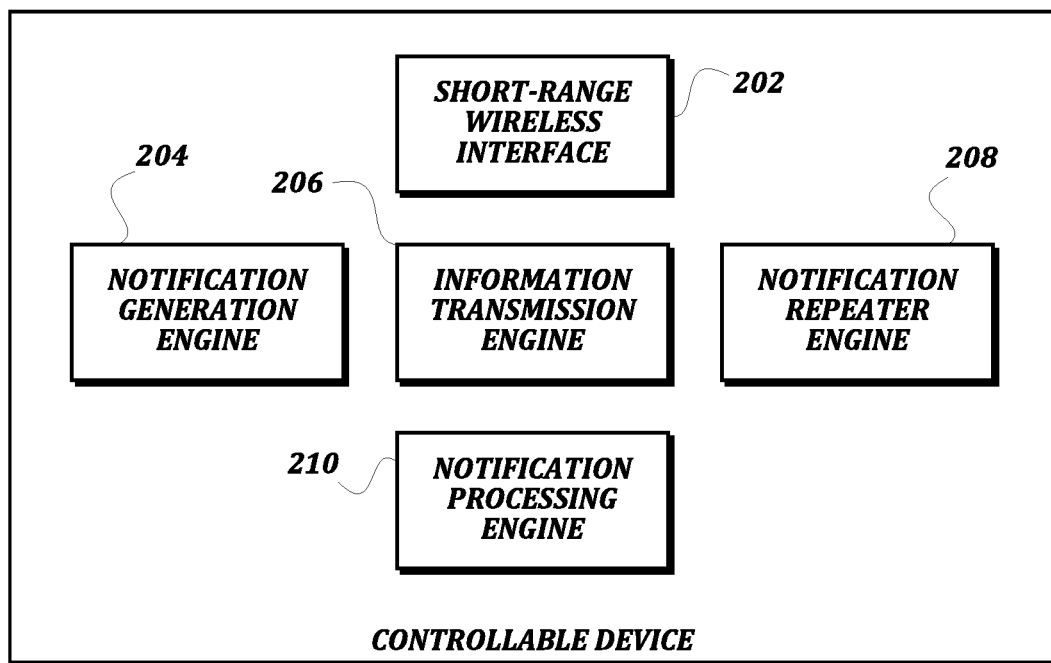
FIG. 2 is a block diagram that illustrates an exemplary embodiment of a controllable device according to various aspects of the present disclosure.

FIG. 2 is a block diagram that illustrates an exemplary embodiment of a controllable device according to various aspects of the present disclosure. As illustrated, the controllable device 702 includes a short-range wireless interface 202. The short-range wireless interface 202 may be configured to use any suitable wireless networking technology capable of wirelessly exchanging data with other devices within range of the controllable device 702, including but not limited to Bluetooth (including Bluetooth Low Energy), ZigBee, NFC, and/or the like.

As illustrated, the controllable device 702 also includes a notification generation engine 204, an information transmission engine 206, a notification repeater engine 208, and a notification processing engine 210. In general, the term "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. An engine may be compiled into executable programs or written in interpreted programming languages. Engines may be callable from other engines or from themselves. Generally, the engines described herein refer to modules that can be merged with other engines to form a single engine, or can be divided into multiple sub-engines. The engines may be embodied in any type of circuit such as an FPGA or an ASIC; and/or may be stored in any type of computer-readable medium or computer storage device and be stored on and executed by one or more general purpose computers, thus creating a special purpose computer configured to provide the engine. Accordingly, the devices and systems illustrated herein include one or more computing devices configured to provide the illustrated engines, though the computing devices themselves have not been illustrated in every case for the sake of clarity.

In some embodiments, the notification generation engine 204 is configured to create and transmit new notifications based on information obtained by components of the controllable device 702. In some embodiments, the information transmission engine 206 is configured to respond to requests for information associated with notifications after notifications have been transmitted by the notification generation engine 204 and received by other devices. In some embodiments, the notification repeater engine 208 is configured to create and transmit notifications based on notifications received by the controllable device 702 from other devices. In some embodiments, the notification processing engine 210 is configured to analyze notifications received from other devices via the short-range wireless interface 202, and to determine whether a setting of the controllable device 702 should be changed in response to the notifications. In some embodiments, the notification processing engine 210 is also configured to filter notifications for selective retransmission.

Further description of the configuration of and actions performed by these components is provided below.

Figure 3:
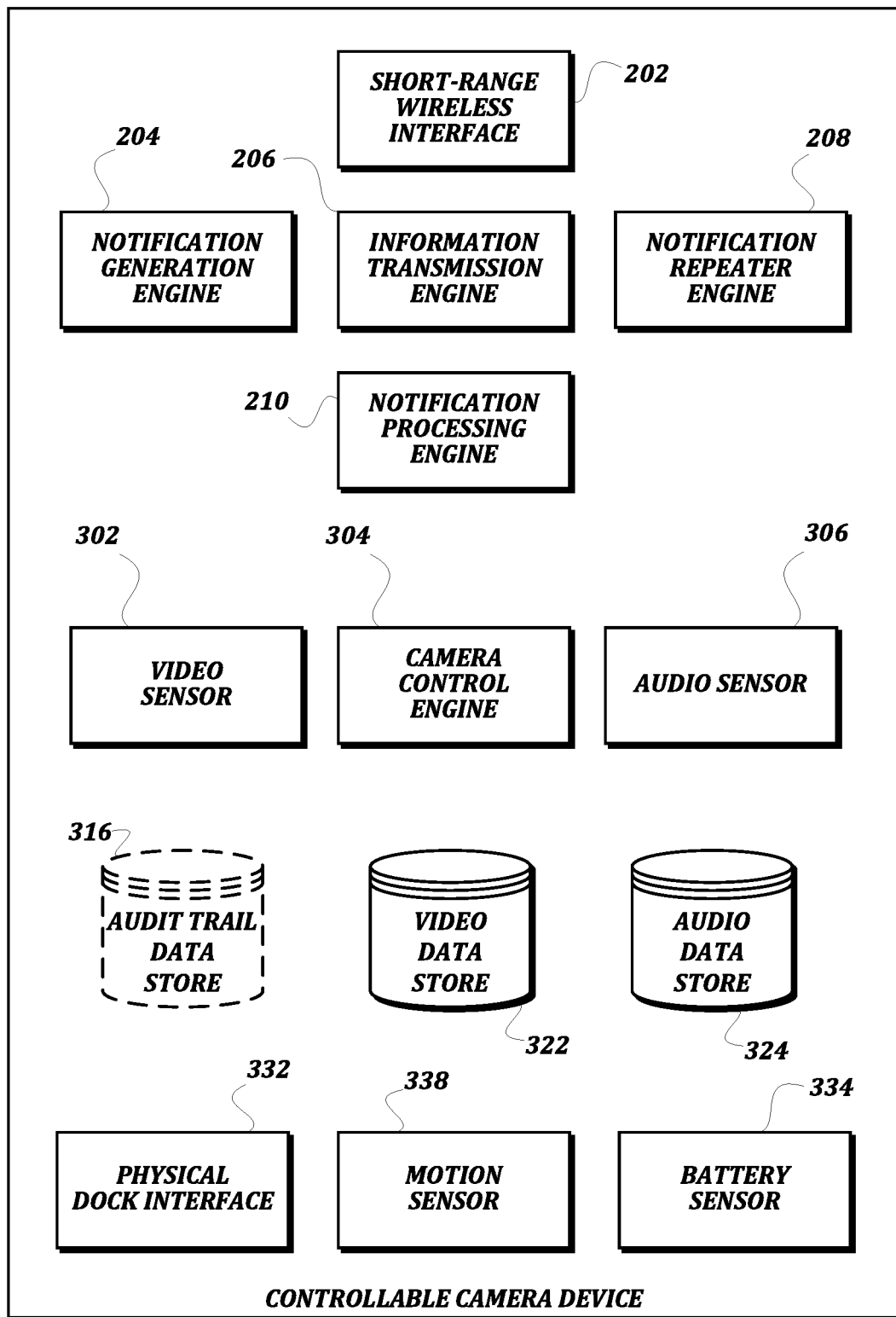
FIG. 3 is a block diagram that illustrates components of an exemplary embodiment of a controllable camera device according to various aspects of the present disclosure.

One of ordinary skill in the art will recognize that, though components common to all controllable devices are illustrated in FIG. 2, in some embodiments, particular controllable devices may include additional components. For example, FIG. 3 is a block diagram that illustrates components of an exemplary embodiment of a controllable camera device according to various aspects of the present disclosure. In some embodiments, the controllable camera device 752 is a wearable camera that provides a point of view associated with the user 92. In some embodiments, the controllable camera device 752 may be attached to another device carried by the user 92, such as a weapon.

Because the controllable camera device 752 is a type of controllable device 702, it includes a short-range wireless interface 202, a notification generation engine 204, an information transmission engine 206, a notification repeater engine 208, and a notification processing engine 210 as described above. Further, as with any camera, the controllable camera device 752 includes at least a video sensor 302, and may also include an audio sensor 306. Data collected by the video sensor 302 and the audio sensor 306 may be stored in a video data store 322 and an audio data store 324, respectively, though in some embodiments the audio and video information is stored together in a single data store and/or in a combined data file. One example of an appropriate video sensor is a charge-coupled device (CCD), though any other digital image sensor, such as a complementary metal-oxide-semiconductor (CMOS) sensor, an active pixel sensor, or any other type of digital image sensor could be used instead. Any type of microphone may be used as an audio sensor 306.

As understood by one of ordinary skill in the art, a "data store" as described herein may be any suitable device configured to store data for access by a computing device. One example of a data store suitable for use with the high capacity needs of the evidence management system 102 is a highly reliable, high-speed relational database management system (RDBMS) executing on one or more computing devices and accessible over a high-speed network. However, any other suitable storage technique and/or device capable of quickly and reliably providing the stored data in response to queries may be used, such as a key-value store, an object database, and/or the like. Further, for the evidence management system 102, the computing device providing the data store may be accessible locally instead of over a network, or may be provided as a cloud-based service. A data store may also include data stored in an organized manner on a computer-readable storage medium, as described further below. One example of a data store suitable for use with the needs of the controllable camera device 752, which includes reliable storage but also low overhead, is a file system or database management system that stores data in files (or records) on a computer-readable medium such as flash memory, random access memory (RAM), hard disk drives, and/or the like. One of ordinary skill in the art will recognize that separate data stores described herein may be combined into a single data store, and/or a single data store described herein may be separated into multiple data stores, without departing from the scope of the present disclosure.

The controllable camera device 752 also includes a camera control engine 304. The camera control engine 304 is configured to change settings of the controllable camera device 752 and thereby cause the controllable camera device 752 to perform camera functions. For example, the camera control engine 304 may cause the video sensor 302 and audio sensor 306 to begin obtaining data, and may cause the video and/or audio data to be saved in a video data store 322 and/or audio data store 324 after receiving it from the sensor. The camera control engine 304 may receive commands to start, pause, or stop the video recording from a physical user interface device of the controllable camera device 752, or may automatically start, pause, or stop the video recording in response to an instruction received from, for example, the notification processing engine 200 related to a notification received via the short-range wireless interface 202. The camera control engine 304 may also change settings on the video sensor 302 and/or audio sensor 306 in response to such instructions, such as an image quality, a white balance setting, a gain, and/or any other video or audio recording setting. Starting video recording may include transitioning from a pre-trigger mode, wherein video data and/or audio data is saved in a pre-trigger buffer such as a ring buffer, to a post-trigger mode wherein video data and/or audio data is saved in the video data store 322 and/or the audio data store 324. Likewise, stopping video recording may include transitioning from the post-trigger mode to the pre-trigger mode.

In some embodiments, the camera control engine 304 may record events relating to starting, pausing, or stopping the video recording, as well as the settings for the video sensor 302 and audio sensor 306, in an audit trail data store 316. In some embodiments, the camera control engine 304 may embed the sensor configuration information in the data stored in the video data store 322 and/or audio data store 324, along with other information about the state of the controllable camera device 752. The notification processing engine 210 may likewise store records of received notifications and/or information, and the notification generation engine 204 may likewise store records of generated notifications and/or information, in the audit trail data store 316, the video data store 322, and/or the audio data store 324.

The controllable camera device 752 may also include a number of general components, including a motion sensor 338, a physical dock interface 332, and a battery sensor 334. The motion sensor 338, such as a multi-axis accelerometer, produces information that may be used by other components. For example, the notification generation engine 204 may use the motion sensor 338 to detect a certain types of motion, such as running, falling, and/or the like, and to generate notifications announcing when particular types of motion are detected.

The physical dock interface 332 is configured to mate with a physical connector on the evidence collection dock 104. In some embodiments, the physical dock interface 332 may include a female 2.5 mm socket, which mates with a male 2.5 mm plug of the evidence collection dock 104. Once docked, the controllable camera device 752 may then transfer data to the evidence management system 102 via the connection using any suitable data transmission protocol. In some embodiments, power may be transferred to the controllable camera device 752 via the physical dock interface 332 instead of or in addition to the data transfer. In some embodiments, other connection hardware that can provide both power and data connectivity may be used, such as a USB connector, a USB Type-C connector, a Firewire connector, and/or the like.

The battery sensor 334 is another example of an internal system that may generate events that are monitored by the notification generation engine 204 for the generation of notifications. For example, the battery sensor 334 may detect a low battery state, a battery overheating state, and/or the like, and may provide alerts to the notification generation engine 204 for the generation of notifications. Other well-known internal device systems, such as a file system controller, a free-fall sensor, and/or the like, may similarly provide alerts to the notification generation engine 204, but are not illustrated here.

Figure 4:
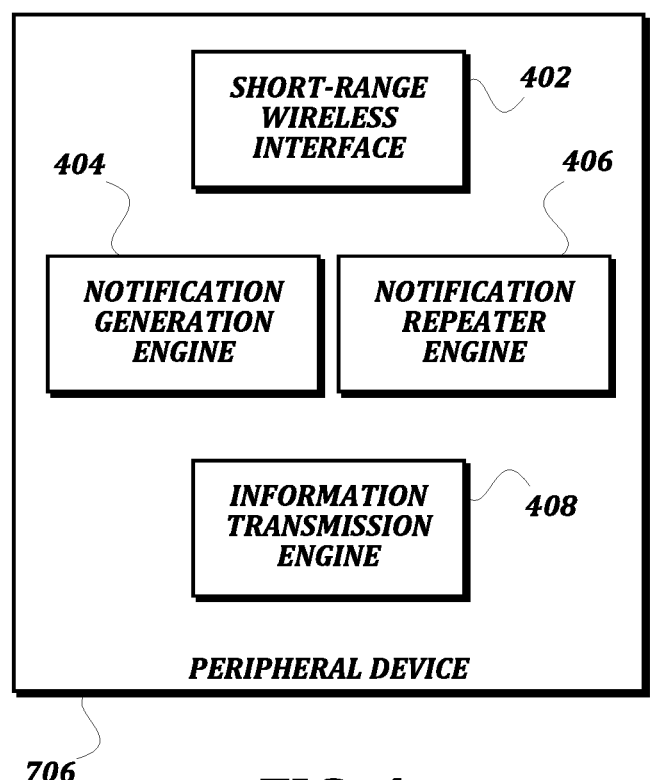
FIG. 4 is a block diagram that illustrates an exemplary embodiment of a peripheral device according to various aspects of the present disclosure.

FIG. 4 is a block diagram that illustrates an exemplary embodiment of a peripheral device according to various aspects of the present disclosure. As illustrated, the peripheral device 706 includes a short-range wireless interface 402, a notification generation engine 404, a notification repeater engine 406, and an information transmission engine 408. One of ordinary skill in the art will recognize that these components are similar to the short-range wireless interface 202, notification generation engine 204, notification repeater engine 208, and information transmission engine 206 illustrated and described above with respect to the controllable device 702. As such, a detailed description of the similar components in the peripheral device 706 is not provided here for the sake of brevity. The peripheral device 706 and the controllable device 702 have some overlapping capabilities (as discussed in more detail below), and so include similar components. However, the peripheral device 706 is generally used as a source of notifications based on events detected by or generated by components of the peripheral device 706, and is not generally controllable based on received notifications. Accordingly, the peripheral device 706 is missing the notification processing engine 210 that is present in the controllable device 702. This allows for the simplification of the hardware used in a peripheral device 706, thus reducing cost and improving battery life.

Figure 5:
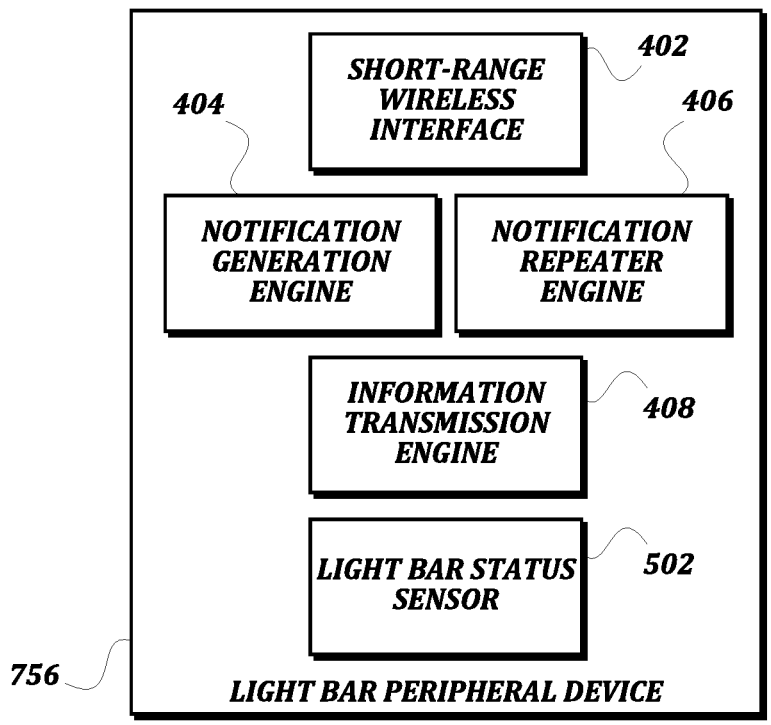
FIG. 5 is a block diagram that illustrates a light bar peripheral device according to various aspects of the present disclosure.

One of ordinary skill in the art will recognize that, though components common to all peripheral devices are illustrated in FIG. 4, in some embodiments, particular peripheral devices may include additional components. As one example, FIG. 5 is a block diagram that illustrates a light bar peripheral device 756 according to various aspects of the present disclosure. The light bar peripheral device 756 is suitable for associating with a light bar 110 of a vehicle 94, and will help make information about the status of the light bar 110 available within the system 100. The light bar peripheral device 756 is a type of peripheral device 706, and so it includes a short-range wireless interface 402, a notification generation engine 404, a notification repeater engine 406, and an information transmission engine 408 as described above.

The light bar peripheral device 756 also includes a light bar status sensor 502. The light bar status sensor 502 is configured to determine at least a state of the lights on the light bar 110 and/or the status of any other hardware associated with the light bar 110, including but not limited to a siren, a camera, and/or the like. The light bar status sensor 502 detects when a state of the light bar 110 changes (e.g., the lights are turned on or off), and is configured to transmit alerts regarding the state changes to the notification generation engine 404. In some embodiments, the notification generation engine 404 receives the alerts from the light bar status sensor 502 and generates notifications when appropriate. The content of the notification generated by the notification generation engine 404 may merely indicate that the status of the light bar 110 has changed, as opposed to also including an indication of the actual status. In response to receiving such a notification, another device may request information that includes the actual status of the light bar 110 from the light bar peripheral device 756. To respond to the request, the information transmission engine 408 may use the light bar status sensor 502 to determine the state of the light bar 110 (e.g., lights on, lights off, a particular pattern being displayed by the lights, and/or the like) for transmission as information associated with the notification.

As will be recognized by one of ordinary skill in the art, although a light bar peripheral device 756 is illustrated and described in FIG. 5, many other types of peripheral devices 706 and controllable devices 702 not illustrated in the drawings may be used within the system 100. These devices will include the common features of the peripheral device 706 and/or the controllable device 702, as well as additional sensors appropriate for detecting relevant statuses of the components of the particular device.

For example, in some embodiments, a weapon peripheral device may be provided. A weapon provides force for self-defense, defense of others, and/or defense of property. For example, a weapon may include conventional circuits and/or mechanisms for cutting (e.g., hand knife, jaws of life), propelling a projectile (e.g., hand gun, shotgun), releasing noxious material (e.g., pepper spray), and/or causing involuntary muscle contractions (e.g., conducted electrical weapons (CEWs) such as those marketed by TASER International Inc.). A weapon peripheral device may include sensors for determining a change in status of a safety device, detecting a discharge of the weapon, detecting a change in loading status of the weapon, and/or the like. As a similar example, a weapon holster peripheral device may be provided. The weapon holster may be configured to carry a weapon when not in use, and the weapon holster peripheral device may include a sensor configured to detect when the weapon is placed into or removed from the holster.

As another example, in some embodiments, a personal assistant device may be configured as a peripheral device. A personal assistant device, such as the personal assistant device 107 illustrated in FIG. 1, may include any personal computer system that performs user-selected programs and supports communication with other officers (e.g., officers not co-located with the officer, officers operating dispatch or inventory functions, and/or the like) and/or communicates with other members of the system (e.g., forwards notices, batches notices to forward, derives a new notice from one or more other notices). For example, a personal assistant may be packaged as or with the functions of a laptop computing device, a wrist-worn computing device, a tablet computing device, a body-worn computing device, a smartphone, and/or the like. Communication may include any conventional technologies (e.g., cellular phone service, text and data messaging, email, voice over IP, push-to-talk, video over cellular, video over IP, and/or the like). Communication may use conventional public or private media (e.g., public cellular phone service, local area service, reserved channels, private trunk service, emergency services radio bands, and/or the like). In some embodiments, the personal assistant device may be configured as a controllable device, as opposed to a peripheral device.

As yet another example, a personal monitor peripheral device may be provided. A personal monitor peripheral device may include any apparatus for monitoring and/or recording physical and biological aspects of the user 92 (e.g., location, orientation, position, acceleration, ambient temperature, body temperature, voice, heart rate, indications of stress, and/or the like). Sensors that generate inputs to a personal monitor peripheral device may be of any conventional technology (e.g., analog voltage or current, frequency, pulse position, optical transducers, hall effect, magnetic induction, acceleration, temperature, audio, and/or the like). In some embodiments, a personal monitor peripheral device permits assessment of a user's present level of physiological stress, psychological stress, and/or capacity to perform his or her duties within the policies and procedures prescribed by his or her superiors. A personal monitor peripheral device may be packaged to be worn on the wrist, chest, waist, and/or head. A personal monitor peripheral device with separable components may communicate among its components using conventional short range communication technology (e.g., Bluetooth, Zigbee, and/or the like).

As still another example, a vehicle monitor peripheral device may be provided. A vehicle monitor peripheral device includes any apparatus for monitoring and/or recording physical aspects of a vehicle (e.g., location, orientation, position, acceleration, ambient temperature, speed, direction, engine performance, supplies of consumables, operating temperature, emissions, operation of integral and accessory equipment, and/or the like). Sensors that generate inputs to a vehicle monitor peripheral device may be of any conventional technology (e.g., analog voltage or current, frequency, pulse position, optical transducers, hall effect, magnetic induction, acceleration, temperature, audio, and/or the like). Any conventional integrated or after-market installation for sensing, monitoring and recording technologies may be used. Some operating mode sensors may include a light bar operating mode sensor be packaged with a light bar; a siren operating mode sensor packaged with a siren; a combined siren and light bar operating mode sensor (if the siren and light bar themselves are combined; vehicle lighting operating mode sensor(s) (e.g., head lights, tail lights, directional and emergency flashers, passenger compartment lighting) packaged with suitable lighting assemblies and/or subassemblies; engine operating mode sensors integrated with engine controls such as ECMs; and/or the like.

In some embodiments, vehicle environment monitors may be provided as peripheral devices or controllable devices. A vehicle environment monitor may include enhanced monitoring and/or recording sensors that expands an unaided user's awareness (e.g., night vision cameras, ultrasound detecting microphones, gunshot detection/location sensor, and/or the like). Other types of sensors that may be provided by a vehicle environment monitor include, but are not limited to: scanners for hidden weapons; sensors for illegal substances such as drugs; breathalyzer devices; still cameras for capturing portraits, scenes, documents, licenses, contraband, or counterfeit goods; video cameras adapted for investigations of particular areas (e.g., under-car or confined space cameras); explosives sensors; and/or the like. Some vehicle environment monitors may also provide analyzed data that goes beyond mere recording. Analysis may include recognition, correlation, and/or prediction based on information monitored or recorded from any source, such as other sensors within the system 100. Analysis of video or still photographs may be used for recognition of car make and model and identification of the owner of the vehicle and owner of the vehicle license. Analysis of audio and video may be used for recognition and identification of voices, faces, body dimensions, birth marks, tattoos, clothing, currency, drivers' licenses, and/or documents. Predictions may include conventional algorithms for the prediction of crime, for example, predictions based on locations of persons, locations of vehicles, recent dispatches, and recent sniffed, snooped, or analyzed network packets.

Figure 6:
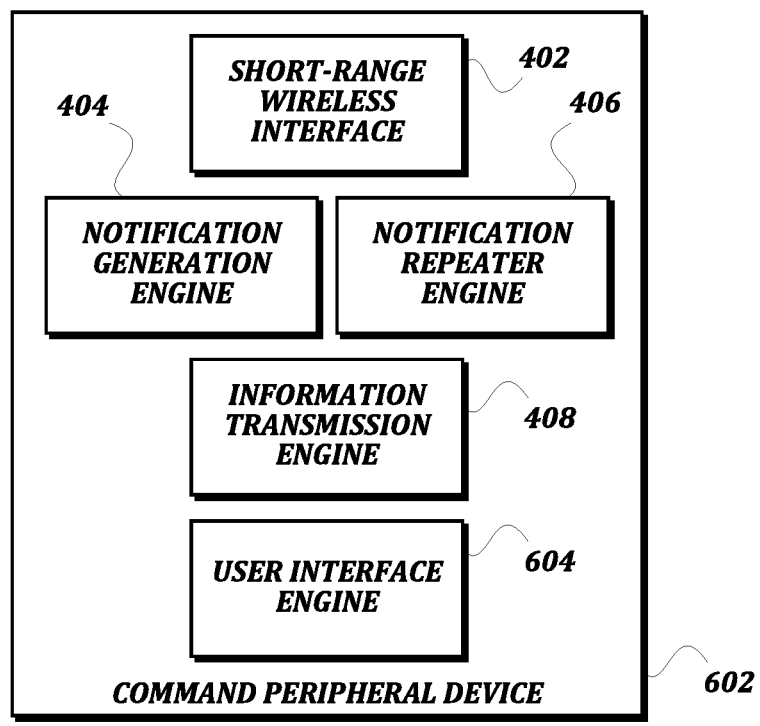
FIG. 6 is a block diagram that illustrates an exemplary embodiment of a command peripheral device according to various aspects of the present disclosure.

In some embodiments, some peripheral devices may be configured to generate notifications as desired by a user, as opposed to automatically in response to data generated by a sensor. As an example, FIG. 6 is a block diagram that illustrates an exemplary embodiment of a command peripheral device 602 according to various aspects of the present disclosure. Again, the command peripheral device 602 is a type of peripheral device 706, and so it includes a short-range wireless interface 402, a notification generation engine 404, a notification repeater engine 406, and an information transmission engine 408 as described above. In contrast to the above, the command peripheral device 602 includes a user interface engine 604. The user interface engine 604 is configured to generate a user interface for accepting commands from a user intended for a controllable device. In this way, notifications may be generated within the system 100 that are not in response to a sensed status change, but are instead intentionally created by a user. When a command is received by the user interface engine 604, the notification generation engine 404 generates a notification and optionally generates information for propagation through the system 100 in a manner similar to other notifications and information.

In some embodiments, the command peripheral device 602 may be an interactive device carried by the user 92 or the vehicle 94, such as a smart phone, a tablet computing device, a laptop computing device, and/or the like. In some embodiments, the command peripheral device 602 may be a desktop computing device or a server computing device located remotely from the user 92 and operated by a dispatcher or other such user. In such embodiments, the command peripheral device 602 may include a long-range network interface, such as a wired network interface, a WiFi network interface, an LTE network interface, and/or the like. The notification in such embodiments would be sent in a targeted manner to another device with a long-range network interface, such as the personal assistant device 107, which may then propagate the notification and/or information throughout the rest of the system 100 as any other notification and/or information is propagated.

Figure 7A:
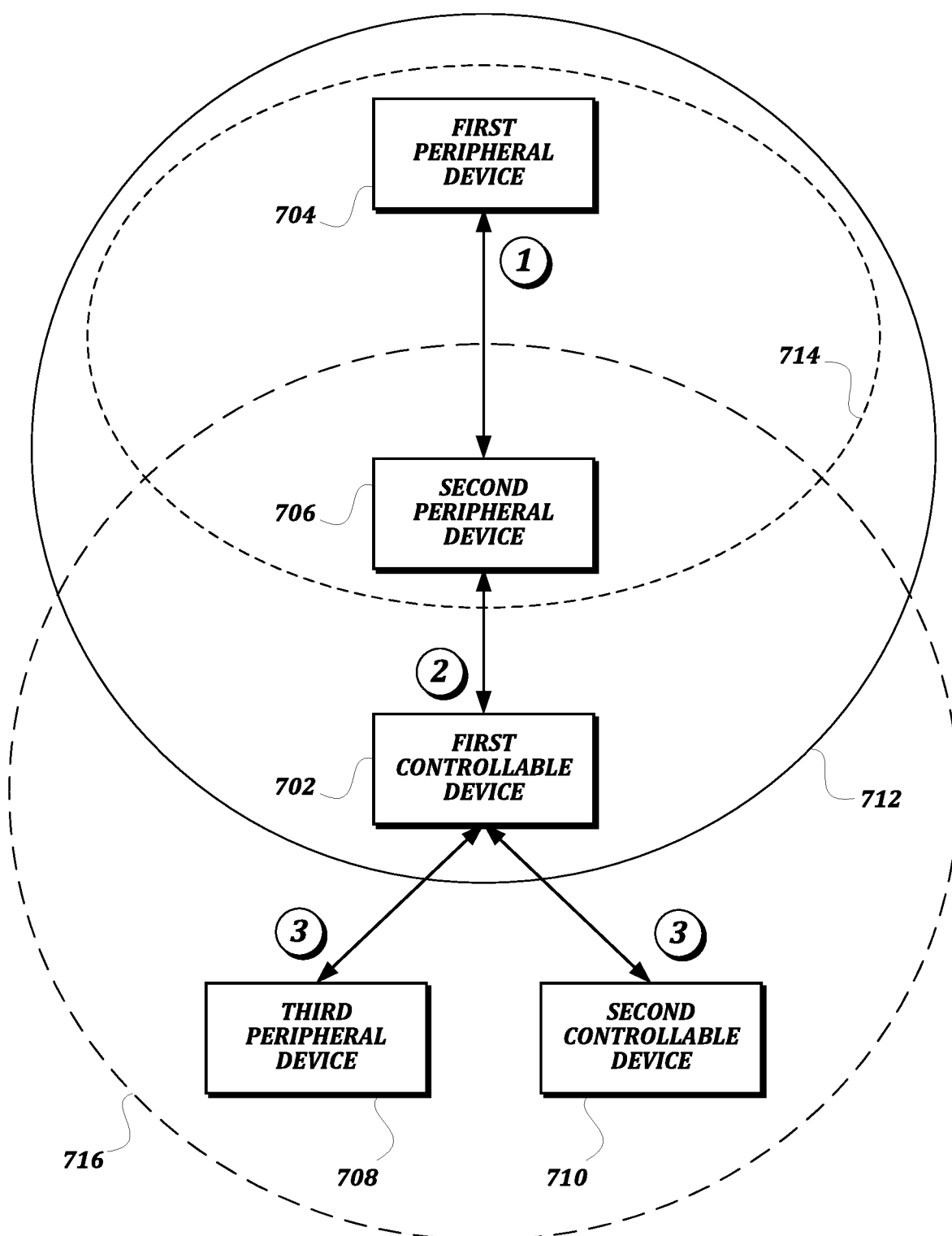
FIGS. 7A-7C are high-level schematic diagrams of exemplary embodiments of communication between devices according to various aspects of the present disclosure.
Figure 7B:
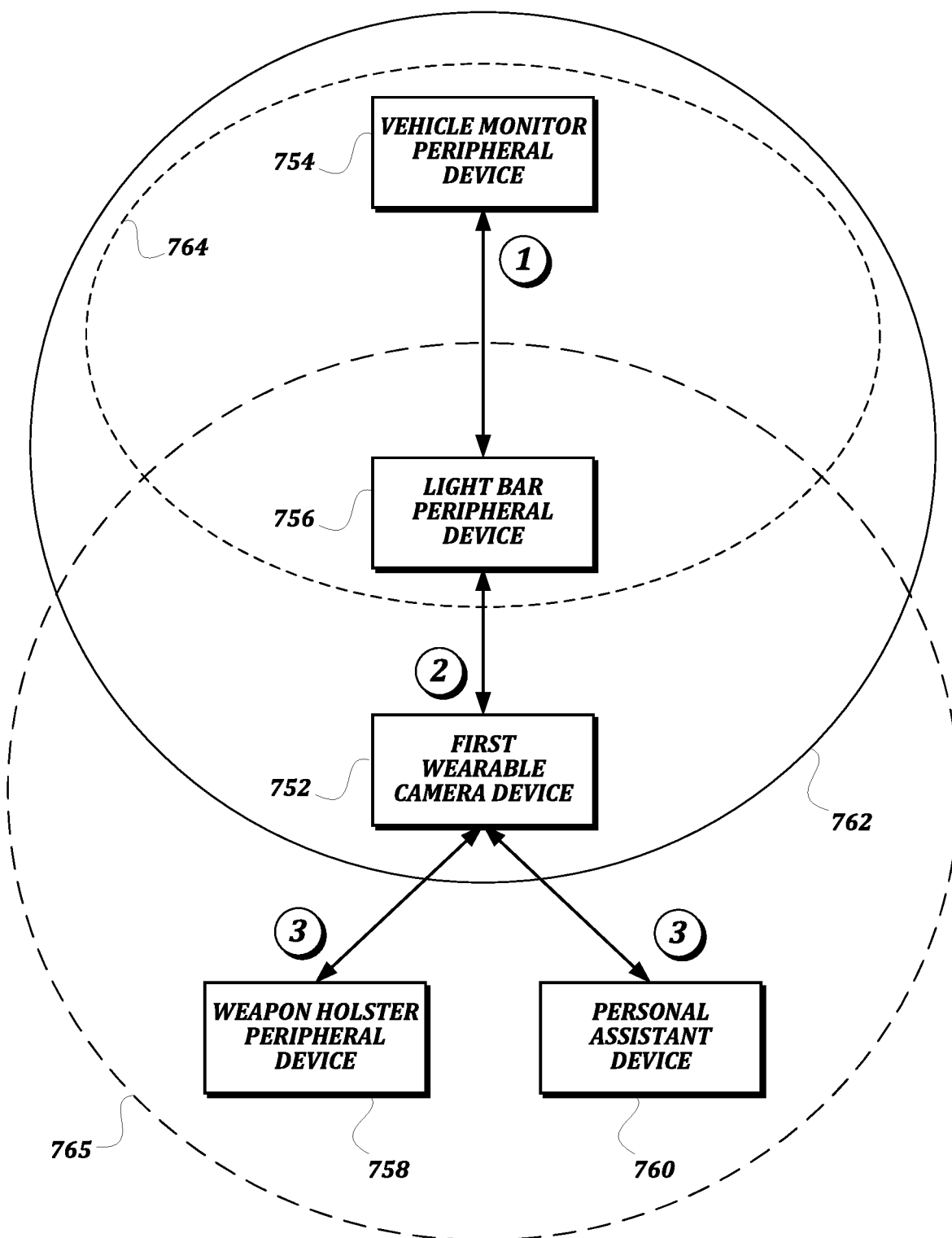
Figure 7C:
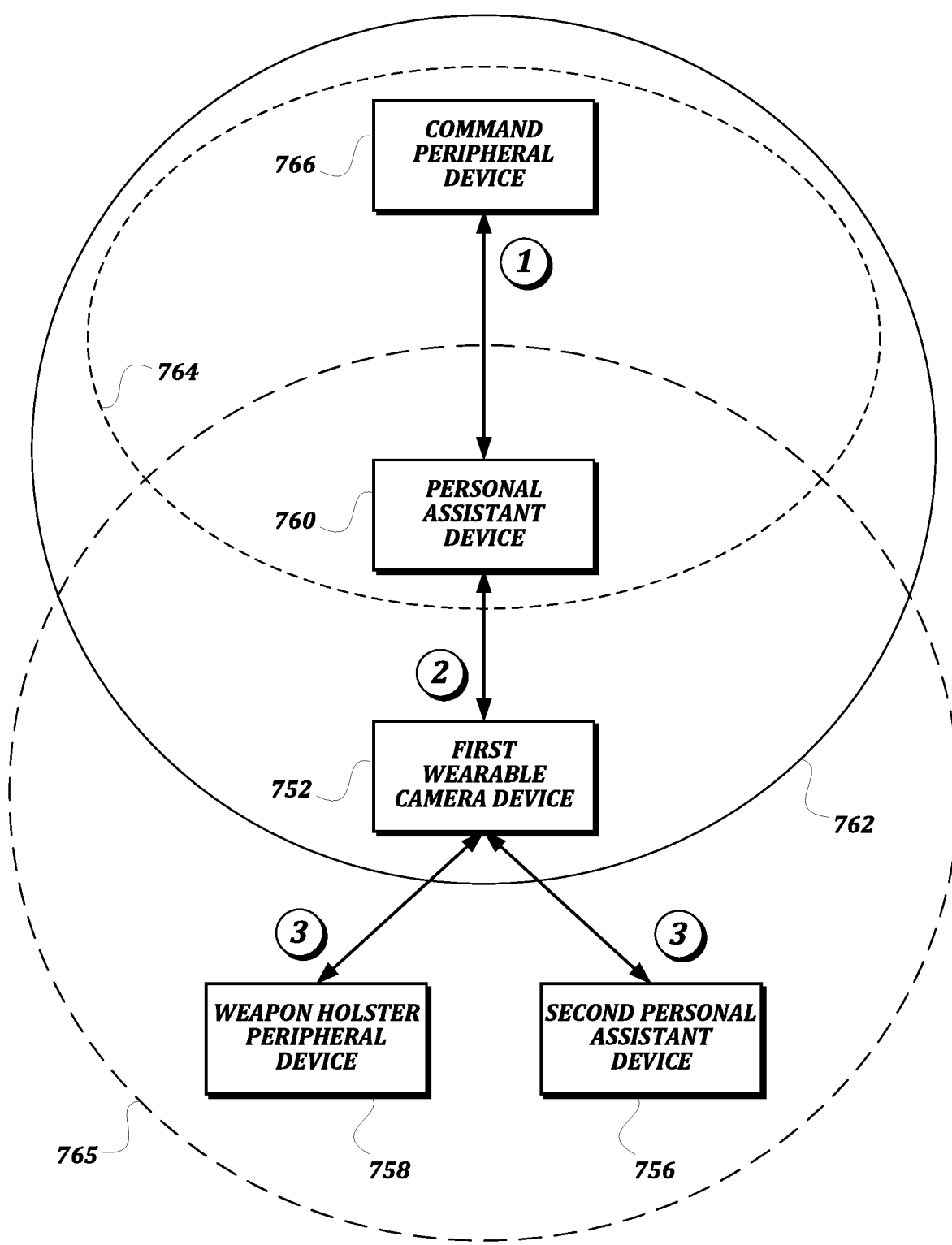

FIGS. 7A-7C are high-level schematic diagrams of exemplary embodiments of communication between devices according to various aspects of the present disclosure. In FIG. 7A, a setting is changed on a first controllable device 702 in response to a notification generated on a first peripheral device 704. The first peripheral device 704 detects an event that causes a notification to be generated. At a first point in a communication sequence, the first peripheral device 704 generates a notification and transmits the notification to one or more devices within a short-range wireless communication range 714 of the first peripheral device 704. As illustrated, a second peripheral device 706 is within the communication range 714, but the first controllable device 702 is not. As discussed in further detail below, the notification may include all of the information needed to describe the event, or the second peripheral device 706 may, upon receiving the notification, request further information from the first peripheral device 704.

At a second point in the communication sequence, the second peripheral device 706 retransmits the notification originally generated by the first peripheral device 704 to other devices within a communication range 712 of the second peripheral device 706. For example, the first controllable device 702 is within the communication range 712 of the second peripheral device 706. Accordingly, the first controllable device 702 receives the notification from the second peripheral device 706. As discussed in further detail below, in some embodiments the notification transmitted by the second peripheral device 706 may be the same notification as that originally transmitted by the first peripheral device 704 and so appears to the first controllable device 702 as having been transmitted by the first peripheral device 704. In some embodiments, the second peripheral device 706 may generate a new notification based on the notification received from the first peripheral device 704, and transmit that new notification to the first controllable device 702. As above, all of the information needed by the first controllable device 702 to change its setting may be included in the notification, or the first controllable device 702 may request further information from the second peripheral device 706 upon receiving the notification. In the second case, the second peripheral device 706 may respond to the request for further information with the information it retrieved from the first peripheral device 704. The first controllable device 702 may then change one or more of its settings based on the notification and/or the information.

At a third point in the communication sequence, the first controllable device 702 may itself retransmit the notification in order to ensure the broadest possible propagation of the notification despite only using short-range wireless technology. Accordingly, the notification retransmitted by the first controllable device 702 may be received by other devices within a communication range 716 of first controllable device 702, such as a third peripheral device 708 and a second controllable device 710. As described above, the retransmitted notification could match the original notification, or could be a new notification based on the original notification. In some embodiments, any retransmitted notification is ignored by the original peripheral device or controllable device, even if the original device is within communication range and receives the retransmitted notification. This may help to avoid exponential growth of transmitted notifications, and may save battery life on the original device by not having to fully process as many incoming notifications.

As stated above, any suitable short-range wireless communication technology may be used for the communication. In some embodiments, if Bluetooth or Bluetooth Low Energy is used, the devices may form piconets and scatternets. For example, the communication range 714 may represent a piconet comprising the first peripheral device 704 and the second peripheral device 706, communication range 712 may represent a piconet comprising the second peripheral device 706 and the first controllable device 702, and communication range 716 may represent a piconet comprising the first controllable device 702, the third peripheral device 708, and the second controllable device 710. As such, communication ranges 712, 714, and 716 may be joined by their common devices to form a scatternet.

In FIG. 7A, generic peripheral devices and controllable devices are discussed in order to illustrate the general types of communication that occur in some typical embodiments. FIG. 7B illustrates a similar communication topology, but describes the participating devices with more particularity in order to demonstrate a practical example of communication according to various aspects of the present disclosure. In FIG. 7B, an event is detected by a vehicle monitor peripheral device 754. For example, the vehicle monitor peripheral device 754 may be installed in a vehicle 94, and may include a sensor that monitors the state of the trunk of the vehicle 94. Upon detecting that the trunk has been opened from a closed state, the vehicle monitor peripheral device 754 generates a notification.

At the first point in the communication sequence, the vehicle monitor peripheral device 754 transmits the notification to devices within its communication range 764, including light bar peripheral device 756 (but not first wearable camera device 752). Once the light bar peripheral device 756 receives the notification, it may request further information from the vehicle peripheral device 754 based on the content of the notification. In some embodiments, the notification may simply be an alert similar to a "door ajar" warning, and so a type included in the notification indicating the "door ajar" alert may be adequate for controllable devices to make decisions regarding what settings to change. However, in some embodiments, more information may be made available by the vehicle monitor peripheral device 754 to indicate, for example, which component of the vehicle 94 is ajar and generating the alert. If the light bar peripheral device 756 determines from the notification that further information is available, then it retrieves the information from the vehicle monitor peripheral device 754.

The first wearable camera device 752 may not be within the communication range 764 of the vehicle monitor peripheral device 754 for a variety of reasons. For example, the user 92 may have travelled away from the vehicle 94, and therefore may not be close enough to the vehicle monitor peripheral device 754. As another example, a line of sight between the vehicle monitor peripheral device 754 and the first wearable camera device 752 may be blocked by the seats of the vehicle 94, the engine of the vehicle 94, or by some other item that blocks low-powered short-range wireless communication between the devices despite their relatively close proximity.

At a second point in the communication sequence after the light bar peripheral device 756 has received the notification, it retransmits the notification to other devices within its communication range 762, such as the first wearable camera device 752. As before, the first wearable camera device 752 may request further information from the light bar peripheral device 756 if it is available. Thereafter, the first wearable camera device 752 may check or change a recording state of its camera in response to the received notification. For example, opening the trunk may indicate that the user 92 is retrieving a weapon, a testing kit, or other items used when responding to an incident that should be recorded. As such, the first wearable camera device 752 may begin recording if recording was not already happening. As another example, closing the trunk may indicate that the items have been replaced by the user 92 and the incident is over, and so the recording could be stopped.

At a third point in the communication sequence, the first wearable camera device 752 itself retransmits the notification to other devices within its communication range 765. These devices may include a weapon holster peripheral device 758 and/or a personal assistant device 760. The notification is not itself relevant to the weapon holster peripheral device 758, but it provides the weapon holster peripheral device 758 the opportunity to retransmit the notification. Likewise, the personal assistant device 760 may not change a setting based on the notification, but it may record the notification, retransmit the notification via a wide-area network in order to notify a dispatch system of the event, ignore the notification completely, or take any other appropriate action.

FIG. 7C illustrates another similar communication topology, in order to describe communication between other particular participating devices as another practical example of communication according to various aspects of the present disclosure. In FIG. 7C, a command peripheral device 766 receives an input via a user interface that causes a notification and optionally information to be generated representing a command. For example, a dispatcher may be sending a user 92 to the scene of an incident, and using the user interface engine of the command peripheral device 766, the dispatcher causes the notification and optionally information to be generated that will cause the camera 752 of the user 92 to be activated.

At the first point in the communication sequence, the command peripheral device 766 transmits the notification and optionally the information to the personal assistant device 760 of the user 92. The communication range 764 of the command peripheral device 766 may indicate a wireless communication range in which the personal assistant device 760 is reachable, or it may indicate a network connection between the command peripheral device 766 and the personal assistant device 760 that traverses two or more networking technologies. For example, the command peripheral device 766 may transmit the notification to the personal assistant device 760 over a wide area network such as the Internet. The command peripheral device 766 may be connected to the Internet via a wired network, and the personal assistant device 760 may be connected to the Internet via WiFi, 3G, 4G, LTE, or any other suitable long-range wireless networking technology.

From this point, the notification propagates similar to the notifications in the previously described examples. At the second point in the communication sequence, the personal assistant device 760 acts as a peripheral device or a controllable device, and transmits the notification to devices within a communication range 762 of the personal assistant device 760, such as the first wearable camera device 752. If the first wearable camera device 752 determines that there is further information associated with the notification, it retrieves the information from the personal assistant device 760. The first wearable camera device 752 then changes a setting based on the notification and/or the information. If the notification is as described above and associated with a command to start recording, the first wearable camera device 752 will start recording based on the notification and/or the information.

At a third point in the communication sequence, the first wearable camera device 752 may retransmit the notification to other devices within a communication range 765 of the first wearable camera device, such as a weapon holster peripheral device 758 and/or a second personal assistant device 756 associated with another user. In some embodiments wherein the original notification was addressed specifically to the first wearable camera device 752, the first wearable camera device 752 may not retransmit the notification because it is only relevant to the first wearable camera device 752. Even in such embodiments, other peripheral devices 706 or controllable devices 702 may be able to take action in response to the start of recording if the first wearable camera device 752 generates and transmits a new notification related to its own change in recording state.

Figure 8A:
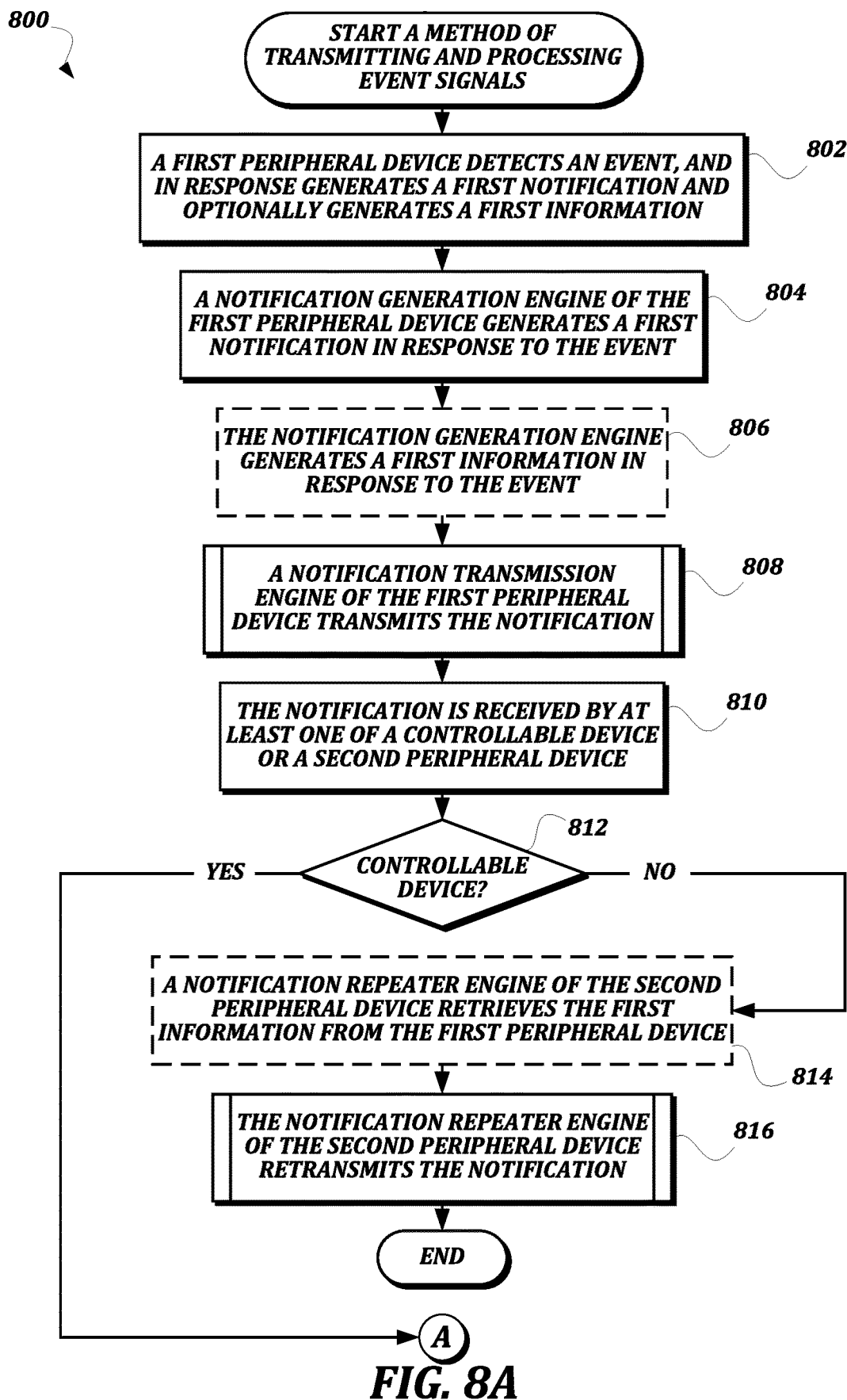
FIGS. 8A-8C are a flowchart that illustrates an exemplary embodiment of a method of transmitting and processing event notifications according to various aspects of the present disclosure.
Figure 8B:
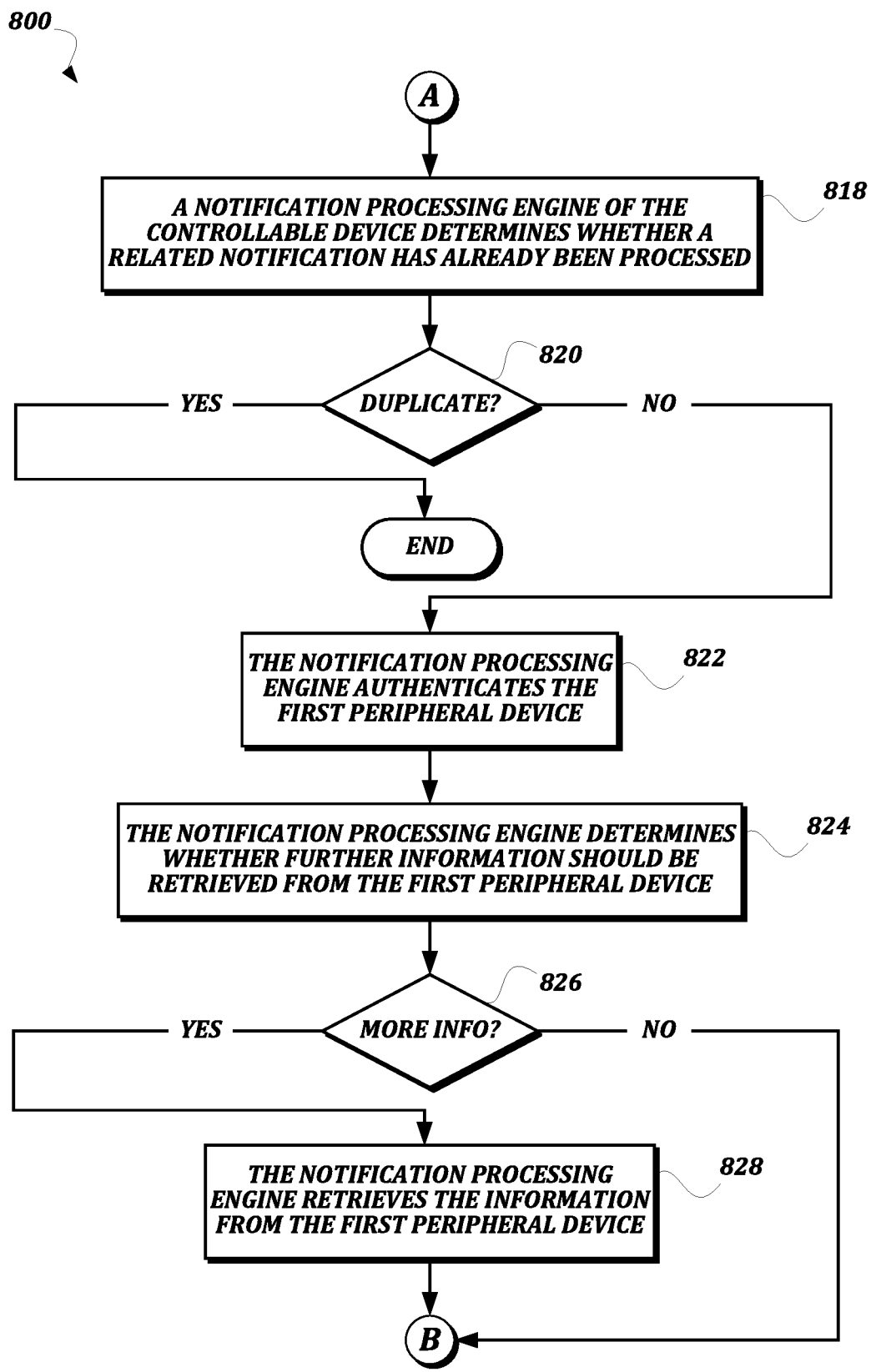
Figure 8C:
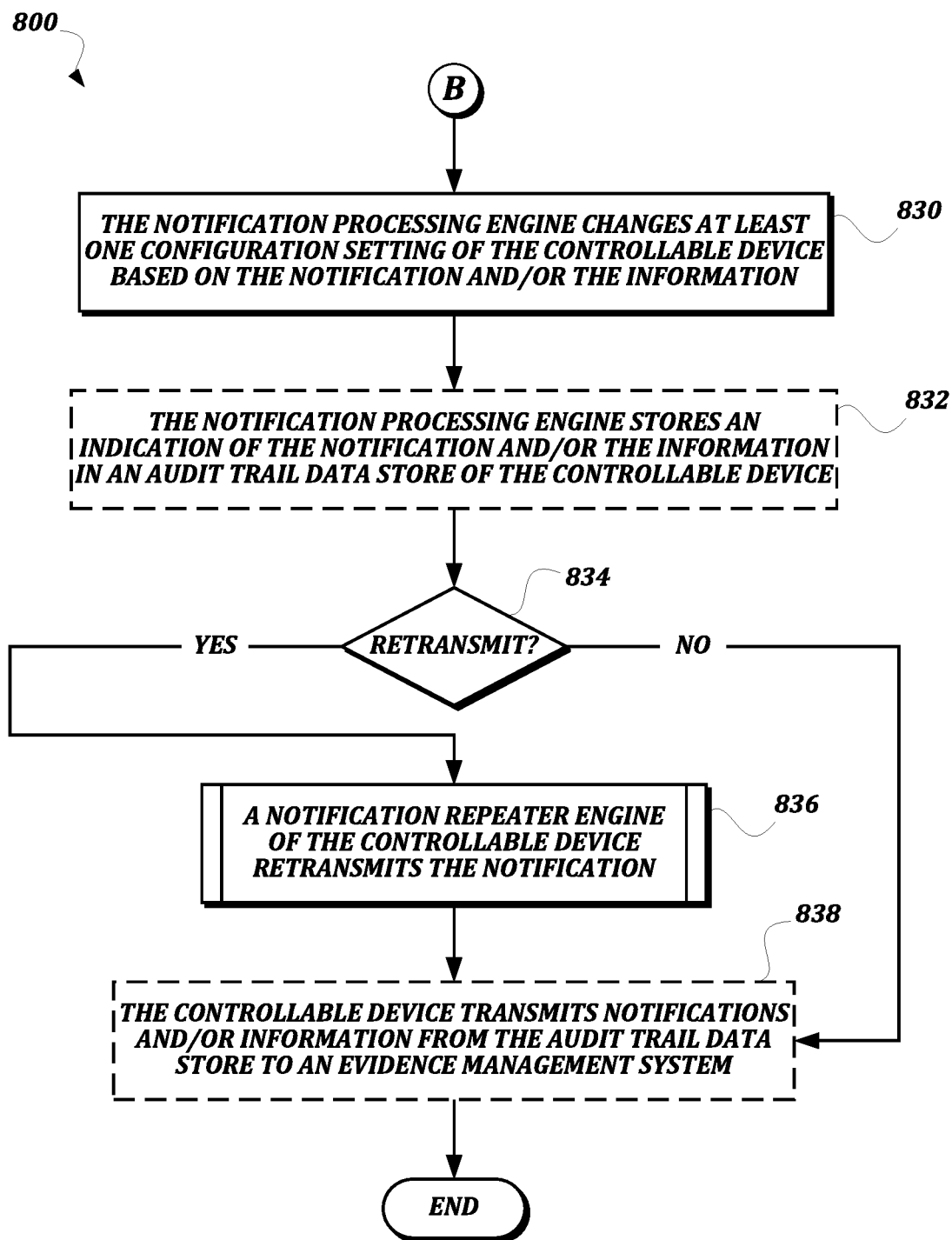

FIGS. 8A-8C are a flowchart that illustrates an exemplary embodiment of a method of transmitting and processing event notifications according to various aspects of the present disclosure. From a start block, the method 800 proceeds to block 802, where a first peripheral device 704 detects an event. As discussed above, a wide variety of events may be detected by peripheral devices, depending on the type of peripheral device. For example, a safety sensor of a weapon peripheral device may detect changes in state of a weapon safety. As another example, a light bar sensor of a vehicle monitor peripheral device may detect a change in state of the light bar as an event. As yet another example, a command peripheral device may detect an event based upon an entry received by its user interface engine. As will be understood by one of ordinary skill in the art, other types of events may also be detected by the peripheral devices described above or by other types of peripheral devices.

At block 804, a notification generation engine 404 of the first peripheral device 704 generates a first notification in response to the event. In some embodiments, the first notification includes a header having a standard layout that includes at least some information relating to the event and/or the first peripheral device 704, such as one or more of a session identifier (described further below); information identifying a type, manufacturer, model, and/or serial number of the first peripheral device 704; information identifying a type of the event; and/or an indication regarding whether more information will be made available. In some embodiments, the first notification may also include a payload with more data based on the type of the event.

At optional block 806, the notification generation engine 404 generates a first information in response to the event. The first information is kept separate from the first notification, and is stored by the first peripheral device 704 until it is requested by a device that receives the first notification. The actions of optional block 806 may be performed in embodiments wherein more information is needed to describe the event than will fit in a single notification packet; in embodiments wherein the information is desired to be communicated via a secure channel instead of via a public broadcast; in embodiments wherein the size of the first notification is intended to be minimized; or in any other suitable embodiment. The actions of block 806 are optional because in some embodiments, none of these goals is desired, and all of the data needed to adequately describe the event fits in the first notification. For example, if the first peripheral device 704 is a heartrate monitor device, a value indicating a current heartrate or heartrate range would not be sensitive information and would likely fit within the notification packet, and so the actions of optional block 806 may not be necessary.

Next, at procedure block 808, a notification transmission engine 404 of the first peripheral device 704 transmits the notification. In some embodiments, the transmission may be a broadcast receivable by any devices within communication range of the first peripheral device 704. In some embodiments, the transmission may be directed to one or more particular devices by virtue of a previously configured setting such as a pairing between the particular devices and the first peripheral device 704. Any suitable procedure for transmitting the notification may be used, including the procedure 900 illustrated in FIG. 9 and described in further detail below.

At block 810, the notification is received by at least one of a controllable device 702 or a second peripheral device 706. The method 800 then proceeds to a decision block 812, after which the remainder of the method 800 changes based on whether the notification was received by a controllable device 702 or a second peripheral device 706. The remainder of method 800 assumes that the notification was received by exactly one controllable device 702 or second peripheral device 706 for ease of discussion only. One of ordinary skill in the art will recognize that, in some embodiments, the same transmitted notification could be received by both a controllable device 702 and a second peripheral device 706, could be received by multiple controllable devices 702, or could be received by multiple other peripheral devices 706, and that portions of the remainder of the method 800 may therefore be conducted concurrently by multiple receiving devices.

If the notification was received by a second peripheral device 706, then the result of the decision block 812 is NO, and the method 800 proceeds to optional block 814. At optional block 814, a notification repeater engine 406 of the second peripheral device 706 retrieves the first information from the first peripheral device 406. The actions of block

814 are optional because, in some embodiments, there may not be first information to retrieve from the first peripheral device 406. In some embodiments, the notification repeater engine 406 will request information from the first peripheral device 704 regardless of whether information is present to be retrieved. In some embodiments, the notification repeater engine 406 may determine whether or not to request information from the first peripheral device 406 based on the first notification. For example, the notification repeater engine 406 may check for an explicit indication regarding the presence or absence of information to be retrieved in the first notification, may check a type of the first notification, may check a type of device that transmitted the first notification, and/or may use any other suitable technique.

At procedure block 816, the notification repeater engine 406 of the second peripheral device 706 retransmits the notification. Again, any suitable transmission technique may be used, including the procedure 900 described in further detail below. In some embodiments, the notification repeater engine 406 may create a new notification, and the original notification and information may be retrievable from the second peripheral device 706 as further information associated with the new notification. In some embodiments, the notification repeater engine 406 may retransmit the notification that matches the first notification, either exactly or with enough alterations such that a receiving device will contact the second peripheral device instead of the first peripheral device for the further information. The method 800 then proceeds to an end block and terminates.

Returning to decision block 812, if the first notification was received by a controllable device 702, then the result at decision block 812 is YES, and the method 800 proceeds to a continuation terminal ("terminal A"). From terminal A (FIG. 8B), the method 800 proceeds to block 818, where a notification processing engine 210 of the controllable device 702 determines whether a related notification has already been processed. In some embodiments, the controllable device 702 is likely to receive duplicate notifications, because the notifications may be transmitted repeatedly for the same event to help overcome intermittent losses in connectivity (as discussed further below). To detect duplicate notifications, the controllable device 702 may save session identifiers that have previously been processed and ignore notifications after the first for a given session identifier; the controllable device 702 may ignore all notifications from a given device for a predetermined amount of time after processing a first notification; the controllable device 702 may create a fingerprint of each processed notification to compare to newly received notifications; or may use any other suitable technique.

At decision block 820, the method 800 branches based on the determination regarding whether a related notification had already been processed. If a related notification had been processed, then the received notification is a duplicate and the result of the determination at decision block 820 is YES. Thereafter, the method 800 proceeds to an end block and terminates. Otherwise, if no related notification had been processed, then the received notification is not a duplicate and the result of the determination at decision block 820 is NO. The method 800 then proceeds to block 822, where the notification processing engine 210 authenticates the first peripheral device 704. Authentication of the first peripheral device 704 is desirable in order to avoid allowing unauthorized malicious notifications to cause unwanted changes in settings of the controllable device 702.

Any suitable technique for authentication may be used. In some embodiments, the controllable device 702 stores a whitelist of serial numbers or other identifiers of peripheral devices 706 for which notifications will be processed, and authentication comprises ensuring that the peripheral device 706 is on the whitelist. In some embodiments, the controllable device 702 may establish an encrypted connection with the peripheral device 706 using any suitable cryptographic communication technique, including but not limited to a Diffie-Hellman elliptical curve technique and/or the like. The controllable device 702 may assume that, if the peripheral device 706 implements the cryptographic communication technique and can establish the encrypted connection, then the peripheral device 706 is authenticated. In some embodiments, this encrypted connection or tunnel may be used to exchange further information between the peripheral device 706 and the controllable device 702. In some embodiments, a digital signature or other certificate stored on the peripheral device 706 is checked by the controllable device 702 for validity in order to authenticate the peripheral device.

Assuming the first peripheral device 704 was properly authenticated, the method 800 proceeds to block 824, where the notification processing engine 210 determines whether further information should be retrieved from the first peripheral device 704. Similar to the discussion above with respect to the actions of the notification repeater engine 406 of the second peripheral device, the notification processing engine 210 may use any suitable technique for determining whether further information should be retrieved from the first peripheral device 704. In some embodiments, the notification processing engine 210 will request information from the first peripheral device 704 regardless of whether information is present to be retrieved. In some embodiments, the notification processing engine 210 may determine whether or not to request information from the first peripheral device 704 based on the first notification. For example, the notification processing engine 210 may check for an explicit indication regarding the presence or absence of information to be retrieved in the first notification, may check a type of the first notification, may check a type of device that transmitted the first notification, and/or may use any other suitable technique. In some embodiments, the notification processing engine 210 may check a whitelist of devices from which information will be requested. The whitelist may define one or more "sets" of devices to which the controllable device 702 belongs, such as a user or officer set, a vehicle set, a group set, a station set, and/or the like.

At decision block 826, the method 800 branches based on the determination regarding whether further information should be retrieved from the first peripheral device 704. If it had been determined that further information should be retrieved from the first peripheral device 704, then the result of the determination at decision block 826 is YES, and the method 800 proceeds to block 828. At block 828, the notification processing engine 210 retrieves the information from the first peripheral device 704 using any suitable technique. In some embodiments, the notification may be a Bluetooth Low Energy advertisement message, and the notification processing engine 210 may retrieve the information by transmitting a scan request packet to the first peripheral device 704. In some embodiments, a tunnel may be established between the first peripheral device 704 and the controllable device 702, and the further information may be retrieved using a serial transmission protocol. The method 800 then proceeds to a continuation terminal ("terminal B"). Returning to decision block 826, if it had been determined that further information should not be retrieved from the first peripheral device 704, then the result of the determination at decision block 826 is NO, and the method 800 proceeds directly to terminal B.

From terminal B (FIG. 8C), the method 800 proceeds to block 830, where the notification processing engine 210 changes at least one configuration setting of the controllable device 702 based on the notification and/or the information. As one example, if the controllable device 702 is a controllable camera device 752, then the notification processing engine 210 may cause the camera control engine 304 to change a recording state of the video sensor 302 and/or audio sensor 306 to start, pause, or stop recording based on the notification and/or the information. As another example, if the controllable camera device 752 is equipped with or can otherwise access a long-range wireless interface, the notification processing engine 210 may cause transmission of a live video or audio stream from the controllable camera device 752 to the evidence management system 102 or other remote device to be started or stopped.

Further, in some embodiments changing a configuration setting may include storing or transmitting data associated with the notification and/or the information. For example, if the controllable device 702 includes a long-range wireless interface, the notification processing engine 210 may cause the controllable device 702 to transmit an SMS, an email, an API call, or any other data transmission based on the notification and/or the information to a remote device. As another example, the notification processing engine 210 may record and aggregate metadata based on the received notifications and/or information, including but not limited to identities of users associated with the notifications (in order to be able to count a total number of users within the system's communication range); a type of the peripheral device that transmitted the notification and its status (in order to be able to count, for example, a total number of activated cameras or weapons drawn in an area); a distance of the peripheral device from the controllable device 702 based on the signal strength; and or the like.

Also, though single notifications are described above, in some embodiments the notification processing engine 210 may use multiple notifications and/or multiple pieces of retrieved information to make the decision regarding the change in a setting. For example, if the notification and information indicate that the trunk of a vehicle 94 associated with the user 92 is open, the notification processing engine 210 may cause other information to be retrieved to determine whether the light bar or siren is active, or whether the vehicle 94 is moving, before causing a change in video or audio recording state. As another example, if several notifications and/or pieces of retrieved information indicate that a weapon has been removed from a holster and the trunk is open, then the video recording state may not be changed (due to the likelihood that the user 92 is merely placing the weapon in the trunk as opposed to using the weapon to apply force. As still another example, if several notifications and or pieces of retrieved information indicate that the user 92 has returned to the driver's seat of the vehicle 94 and that the user's holster is empty, then the notification processing engine 210 may cause a warning message to be transmitted or displayed.

At optional block 832, the notification processing engine 210 stores an indication of the notification and/or the information (depending on whether additional information was retrieved) in an audit trail data store 316 of the controllable device 702. The actions at block 832 are optional because not all embodiments of a controllable device 702 will include an audit trail data store 316, but may instead apply the configuration setting change without storing a record of the change, the notification, or the information. In some embodiments, instead of storing the notification and/or the information in an audit trail data store 316, the notification processing engine 210 may add data from the notification and/or the information to data recorded by the controllable device 702 or metadata associated with data recorded by the controllable device 702, including but not limited to metadata associated with video data or audio data.

The method 800 then proceeds to decision block 834, where a determination is made regarding whether the controllable device 702 should retransmit the notification and/or the information. In some embodiments, the controllable device 702 may retransmit all notifications, as does the peripheral device 706. In some embodiments, the controllable device 702 may filter some notifications and may not retransmit them. For example, in some embodiments, the notification processing engine 210 may detect that a notification was addressed specifically to the controllable device 702, and may therefore not retransmit it because it will not be relevant to other devices. As another example, in some embodiments, the notification processing engine 210 may not retransmit notifications of certain types or from certain types of devices.

If the determination at decision block 834 is that the controllable device 702 should retransmit the notification, then the result of decision block 834 is YES, and the method 800 proceeds to procedure block 836, where a notification repeater engine 208 of the controllable device 702 retransmits the notification. Again, any suitable transmission technique may be used, including the procedure 900 described in further detail below. In some embodiments, the notification repeater engine 208 may create a new notification, and the original notification and information may be retrievable from the controllable device 702 as further information associated with the new notification. In some embodiments, the notification repeater engine 208 may retransmit the notification that matches the first notification, either exactly or with enough alterations such that a receiving device will contact the first peripheral device instead of the controllable device 702 for the further information. The method 800 then proceeds to optional block 838. Returning to decision block 834, if the determination is that the controllable device 702 should not retransmit the notification, then the result of decision block 834 is NO, and the method 800 proceeds directly to optional block 838.

At optional block 838, the controllable device 702 transmits notifications and/or information from the audit trail data store 316 to an evidence management system 102. The information may be transmitted from the audit trail data store 316 to the evidence management system 102 using any suitable technique, including via an evidence collection dock 104 or via an ad-hoc wireless communication path. In some embodiments, urgent notifications and/or information may be transmitted to the evidence management system 102 via the ad-hoc wireless communication path, including via a coordinator computing device, as soon as possible after the receipt of the notification and/or information whether or not it is stored in the audit trail data store 316. The actions described at block 838 are optional because not all embodiments transmit information to an evidence management system 102, nor do all embodiments include an audit trail data store 316. The method 800 then proceeds to an end block and terminates.

Figure 9:
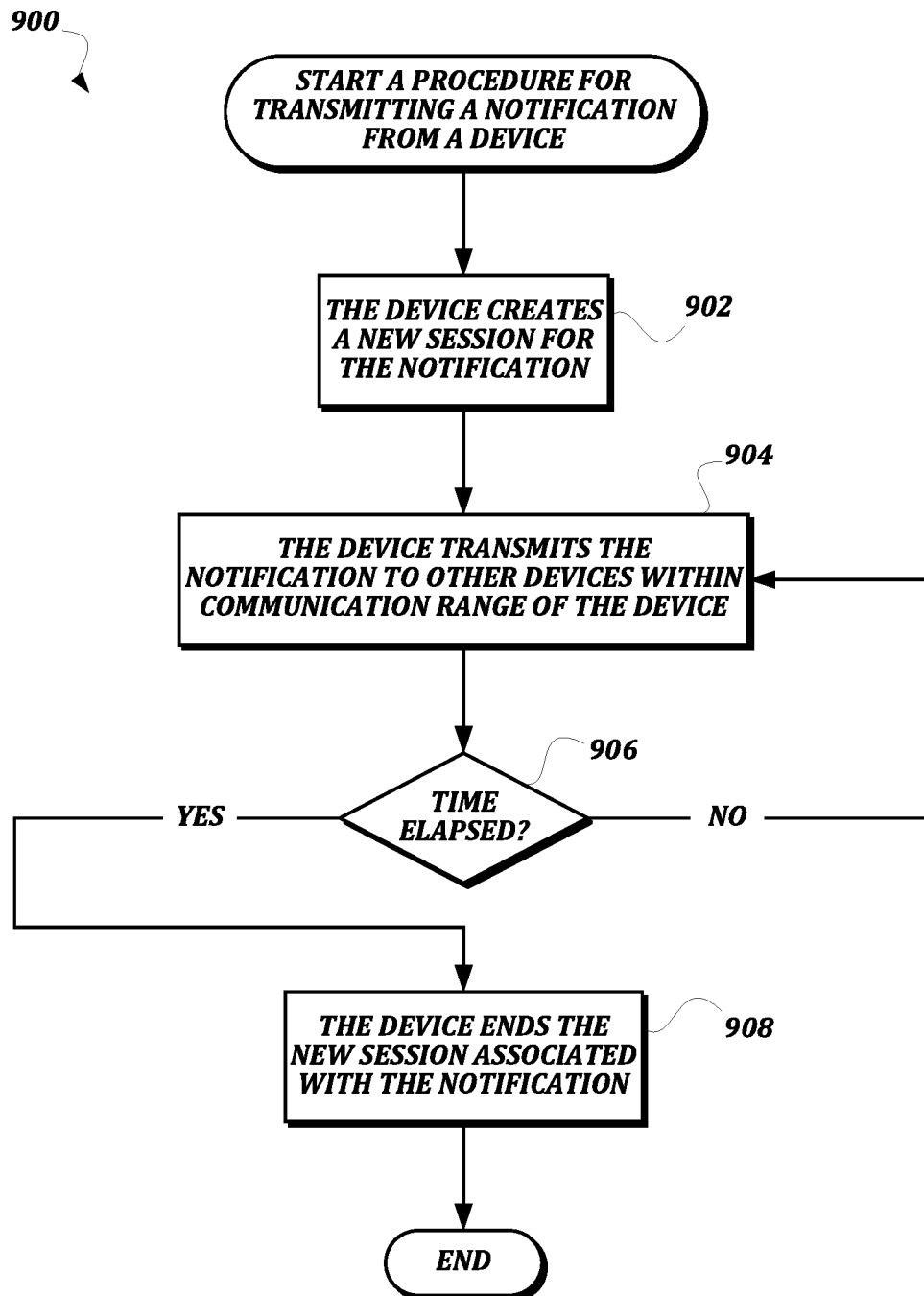
FIG. 9 is a flowchart that illustrates a procedure for transmitting a notification from a device according to various aspects of the present disclosure.

FIG. 9 is a flowchart that illustrates a procedure for transmitting a notification from a device according to various aspects of the present disclosure. As discussed above, the procedure 900 is suitable for use by a peripheral device 706 or a controllable device 702, as discussed in blocks 808, 816, and 836 of the method 800 described above. Because similar steps would be performed by either device at any of these blocks 808, 816, and 836, separate descriptions of each block are not provided.

The technique described in the procedure 900 has many advantages. For example, the procedure 900 can overcome issues with intermittent connectivity, which may be caused by an intermittent lack of line of sight between devices, devices intermittently moving out of communication range of each other, and/or the like. For example, if a low-power short-range wireless communication technique is used, the line of sight may be blocked by the user's body, the frame of a vehicle, and/or the like. As another example, the devices may travel into and out of range of each other during an activity such as a foot pursuit, a traffic stop, and/or the like. As another example of an advantage, the short periods for which notifications are transmitted helps to strike a balance that reduces power consumption and thereby increases battery life. As yet another example of an advantage, the use of sessions (as described below) may help allow receiving devices to ignore duplicate notifications, thereby further reducing processing and power drains.

From a start block, the procedure 900 advances to block 902, where the device creates a new session for the notification. In some embodiments, the new session is identified by a session identifier. In some embodiments, creating the new session may simply increment a session identifier value based on a previous session identifier value for the device. In some embodiments, the device may randomly choose a session identifier or use an unpredictable but deterministic sequence of session identifier values, such as the output of a pseudo-random number generator for a given seed, so that a receiving device can compare the session identifier value to an expected next session identifier value for authentication purposes.

At block 904, the device transmits the notification to other devices within communication range of the device. In some embodiments, the notification may be a broadcast transmission or otherwise unaddressed, such that any device within communication range may receive and process the notification. In some embodiments, the notification may be addressed or otherwise directed to one or more particular devices, such as devices that had previously been paired to the transmitting device, devices that are the particular target of the notification, and/or the like. In some embodiments, the notification may be transmitted using a radio frequency communication technique. In some embodiments, the radio frequency used may be in the 2.4 GHz band in order to avoid interference with police bands used for other equipment. In some embodiments, the notification may be transmitted using a short-range wireless networking technology, such as Bluetooth or Bluetooth Low Energy. In some embodiments, wired communication and/or long-range wireless communication may be used to implement at least part of the communication path used to transmit the notification. For example, the transmitting device may be a command peripheral device 602 operated by a dispatcher on a wired network, and the notification may be addressed to a peripheral device 706 or a controllable device 702 in the field, such as a smart phone device or a controllable camera device 752 having a long-range wireless interface such as LTE or WiFi.

In some embodiments, the notification may be included in a Bluetooth Low Energy advertisement message as defined by the respective protocol. Some portions of the message format may be defined by the systems designer (e.g., the predefined sequence of information in the payload, the quantity of bits predefined to convey various information in the payload, and/or the like). In some embodiments, the format described below in Table 1 may be used. Other embodiments, according to various aspects of the present disclosure, may use a different sequence of information in the payload. Still other embodiments, according to various aspects of the present disclosure, use different quantities of bits for information in the payload. Shorter payloads permit more messages to be sent and received per unit time.

TABLE 1

| Bit Position | Name | Description and Alternatives |
|---|---|---|
| 1-8 | Preamble | Tunes receiver; defined by protocol |
| 9-40 | Access address | Distinguishes an intended message from noise; defined by protocol |
| 41-48 | Header | Packet type defined by protocol |
| 49-56 | Length | Number of bits in the Payload |
| 57-353 | Payload | See following rows |
| 57-88 | Sender manufacturer | A code number, a more meaningful coded text abbreviation |
| 89-100 | Sender model | A code number, a more meaningful coded text abbreviation |
| 101-148 | Sender serial number | A binary integer, a code comprising digits, a code comprising characters |
| 149-164 | Sender faults | A set of binary true/false values each conveying a predetermined fault condition in the transmitting device |
| 165-180 | Session identifier | A binary integer |
| 181-200 | Status | A set of bits providing data that carries status information regarding the device (or an event detected by the device) |
| 201-353 | reserved | May be omitted from the message |
| 353-376 | CRC | Cyclic redundancy check code for the message or for one or more suitable portions of the message (e.g., header, length, payload, portion of the payload) |

After transmitting the notification, the procedure 900 waits for a predetermined amount of time. The amount of time for which the procedure 900 waits may be configurable by an administrator or designer of the system in order to balance battery life with a likelihood of successful communication (shorter wait times increase the likelihood of successful communication, but reduce battery life). In some embodiments, the amount of time may be a value in the range of 1-10 seconds, such as 5 seconds. In some embodiments, an extra random delay interval between 0 and 10 ms may be added to the amount of time to help avoid collisions between notifications.

After waiting, the procedure 900 then proceeds to a decision block 906, where a determination is made regarding whether a predetermined amount of time has elapsed since the creation of the new session. In some embodiments, the predetermined amount of time may be configurable by an administrator or designer of the system; in some embodiments, the predetermined amount of time may be a value in the range of 20-60 seconds, such as 30 seconds. Again, longer sessions increase likelihood of successful communication, but reduce battery life on both the transmitter and receiver.

If the predetermined amount of time has not elapsed since the creation of the new session, then the result of the determination at decision block 906 is NO, and the procedure 900 returns to block 904. Otherwise, if the predetermined amount of time has elapsed, then the result of the determination at decision block 906 is YES, and the procedure 900 advances to block 908, where the device ends the new session associated with the notification. Once the new session ends, no more transmissions will be made using the session identifier. In some embodiments, the end of a session also stops the transmission of further notifications until the procedure 900 is executed a subsequent time. In some embodiments, events other than the elapsing of the predetermined amount of time may cause session to end. For example, in some embodiments, a new event that supersedes the previous event, such as another change in camera or light bar state, or crossing an additional heart rate threshold, may cause the session to end so that a new session can be started. As another example, in some embodiments, a confirmed receipt by a targeted recipient device may cause the session to end.

The procedure 900 then proceeds to an end block and terminates.

Figure 10:
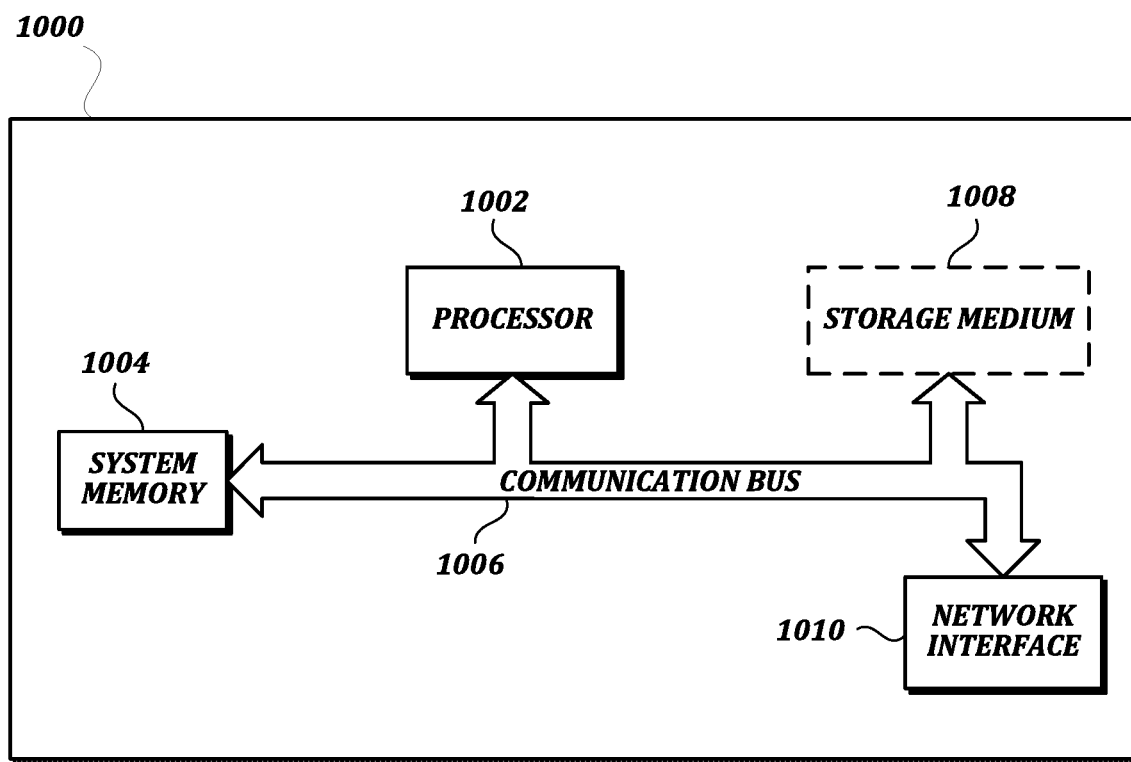
FIG. 10 is a block diagram that illustrates aspects of an exemplary computing device appropriate for use as a computing device of the present disclosure.

FIG. 10 is a block diagram that illustrates aspects of an exemplary computing device appropriate for use as a computing device of the present disclosure. While multiple different types of computing devices were discussed above, the exemplary computing device 1000 describes various elements that are common to many different types of computing devices. While FIG. 10 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 1000 may be any one of any number of currently available or yet to be developed devices.

In its most basic configuration, the computing device 1000 includes at least one processor 1002 and a system memory 1004 connected by a communication bus 1006. Depending on the exact configuration and type of device, the system memory 1004 may be volatile or nonvolatile memory, such as read only memory ("ROM"), random access memory ("RAM"), EEPROM, flash memory, or similar memory technology. Those of ordinary skill in the art and others will recognize that system memory 1004 typically stores data and/or program modules that are immediately accessible to and/or currently being operated on by the processor 1002. In this regard, the processor 1002 may serve as a computational center of the computing device 1000 by supporting the execution of instructions.

As further illustrated in FIG. 10, the computing device 1000 may include a network interface 1010 comprising one or more components for communicating with other devices over a network. Embodiments of the present disclosure may access basic services that utilize the network interface 1010 to perform communications using common network protocols. The network interface 1010 may also include a wireless network interface configured to communicate via one or more wireless communication protocols, such as WiFi, 2G, 3G, LTE, WiMAX, Bluetooth, and/or the like. As will be appreciated by one of ordinary skill in the art, the network interface 1010 illustrated in FIG. 10 may represent one or more wireless interfaces or physical communication interfaces described and illustrated above with respect to particular components of the system 100.

In the exemplary embodiment depicted in FIG. 10, the computing device 1000 also includes a storage medium 1008. However, services may be accessed using a computing device that does not include means for persisting data to a local storage medium. Therefore, the storage medium 1008 depicted in FIG. 10 is represented with a dashed line to indicate that the storage medium 1008 is optional. In any event, the storage medium 1008 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 1004 and storage medium 1008 depicted in FIG. 10 are merely examples of computer-readable media.

Suitable implementations of computing devices that include a processor 1002, system memory 1004, communication bus 1006, storage medium 1008, and network interface 1010 are known and commercially available. For ease of illustration and because it is not important for an understanding of the claimed subject matter, FIG. 10 does not show some of the typical components of many computing devices. In this regard, the computing device 1000 may include input devices, such as a keyboard, keypad, mouse, microphone, touch input device, touch screen, tablet, and/or the like. Such input devices may be coupled to the computing device 1000 by wired or wireless connections including RF, infrared, serial, parallel, Bluetooth, USB, or other suitable connections protocols using wireless or physical connections. Similarly, the computing device 1000 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

What is claimed is:

1. A system for changing configuration settings on controllable camera devices in response to automatically detected status changes, the system comprising:
   a first peripheral device comprising a first sensor and a first short-range wireless interface, the first peripheral device configured to perform first operations comprising:
      detecting a first change in status via the first sensor;
      automatically generating a first notification in response to the detected first change in status, the first notification including first status information regarding the detected first change in status; and
      broadcasting the first notification via the first short-range wireless interface, wherein the broadcasting includes repeatedly transmitting the first notification via the first short-range wireless interface for a first predetermined amount of time;
   a first controllable camera device comprising a first video sensor and a second short-range wireless interface, the first controllable camera device configured to perform second operations comprising:
      recording first video data collected by the first video sensor;
      receiving the first notification from the first peripheral device via the second short-range wireless interface;
      making a first determination whether a first configuration setting of the first controllable camera device should be changed in response to the first status information; and changing the first configuration setting of the first controllable camera device when the first determination includes the first configuration setting of the first controllable camera device should be changed in response to the first status information; and a second controllable camera device comprising a second video sensor and a third short-range wireless interface, the second controllable camera device configured to perform third operations, comprising:
recording second video data collected by the second video sensor;
receiving the first notification via the third short-range wireless interface;
making a second determination whether a second configuration setting of the second controllable camera device should be changed in response to the first status information; and
changing the second configuration setting of the second controllable camera device when the second determination includes the second configuration setting of the second controllable camera device should be changed in response to the first status information, wherein:
changing the first configuration setting comprises at least one of starting the recording of the first video data, causing transmission of a first live video stream from the first controllable camera device via a first long-range wireless interface, or transmitting first data based on the first status information via the first long-range wireless interface to a remote device;
changing the second configuration setting comprises at least one of starting the recording of the second video data, causing transmission of a second live video stream from the second controllable camera device via a second long-range wireless interface, or transmitting second data based on the first status information via the second long-range wireless interface to the remote device; and
the first peripheral device includes one of a weapon peripheral device, a weapon holster peripheral device, a vehicle monitor peripheral device, and a personal monitor peripheral device.

2. The system of claim 1, wherein the first notification is unaddressed.

3. The system of claim 1, wherein the first notification further comprises information identifying a type of the first peripheral device;
making the first determination comprises making the first determination in response to the first status information and the information identifying the type of the first peripheral device;
making the second determination comprises making the second determination in response to the first status information and the information identifying the type of the first peripheral device;
changing the first configuration setting comprises changing the first configuration setting of the first controllable camera device when the first determination includes the first configuration setting of the first controllable camera device should be changed in response to the first status information and the information identifying the type of the first peripheral device; and
changing the second configuration setting comprises changing the second configuration setting of the second controllable camera device when the second determination includes the second configuration setting of the second controllable camera device should be changed in response to the first status information and the information identifying the type of the first peripheral device.

4. The system of claim 1, wherein changing the first configuration setting includes starting the recording of the first video data and adding the first status information to first metadata associated with the first video data; and
changing the second configuration setting includes starting the recording of the second video data and adding the first status information to second metadata associated with the second video data.

5. The system of claim 1, wherein changing the first configuration setting includes starting the recording of the first video data; and
changing the second configuration setting includes starting the recording of the second video data.

6. The system of claim 5, wherein starting the recording of the first video data comprises transitioning from a pre-trigger mode of the first controllable camera device to a post-trigger mode of the first controllable camera device;
the first video data is saved in a pre-trigger buffer of the first controllable camera device in the pre-trigger mode; and
the first video data is saved in a video data store of the first controllable camera device in the post-trigger mode of the first controllable camera device.

7. The system of claim 1, wherein changing the first configuration setting includes starting the recording of the first video data; and
changing the second configuration setting includes transmitting the second data based on the first status information via the second long-range wireless interface to the remote device.

8. The system of claim 1, wherein the first peripheral device comprises the vehicle monitor peripheral device and the first sensor comprises an analog voltage sensor.

9. The system of claim 1, wherein the second operations further comprise authenticating the first peripheral device in response to receiving the first notification, and wherein the authenticating includes determining whether the first peripheral device is on a whitelist stored on the first controllable camera device.

10. The system of claim 1, further comprising a second peripheral device comprising a second sensor and a fourth short-range wireless interface, the second peripheral device configured to perform fourth operations comprising:
detecting a second change in status via the second sensor;
automatically generating a second notification in response to the detected second change in status, the second notification including second status information regarding the detected second change in status; and
broadcasting the second notification via the fourth short-range wireless interface, wherein:
the second operations of the first controllable camera device further comprise:
receiving the second notification via the second short-range wireless interface; and
changing the first configuration setting of the first controllable camera device in response to the second status information; and
the third operations of the second controllable camera device further comprise:
receiving the second notification via the third short-range wireless interface; and not changing the second configuration setting of the second controllable camera device in response to the second status information.

11. The system of claim 1, wherein the first notification includes a first session identifier and repeatedly transmitting the first notification includes repeatedly transmitting the first session identifier included in the first notification.

12. The system of claim 11, wherein repeatedly transmitting the first notification comprises:
repeatedly transmitting the first notification after waiting for a second predetermined amount of time; and
repeatedly transmitting the first notification until the first predetermined amount of time has elapsed, wherein the first predetermined amount of time is longer than the second predetermined amount of time.

13. The system of claim 1, wherein the second operations further comprise:
receiving a third notification via the second short-range wireless interface;
detecting that the third notification is a duplicate notification relative to the first notification; and
ignoring the third notification in response to the detecting.

14. The system of claim 13, wherein the first notification and the third notification each include a same session identifier and detecting that the third notification is the duplicate notification includes detecting that the third notification is the duplicate notification based on the same session identifier.

15. The system of claim 1, wherein:
the second operations further comprise retransmitting the first notification via the second short-range wireless interface; and
receiving the first notification via the third short-range wireless interface comprises receiving the retransmitted first notification from the first controllable camera device.

16. A peripheral device for changing settings of multiple controllable camera devices, the peripheral device comprising:
a plurality of sensors; and
a short-range wireless interface, the peripheral device configured to perform operations comprising:
detecting a first change in status based on first data generated by a first sensor of the plurality of sensors;
automatically generating a first notification in response to the detected first change in status, the first notification including first status information indicating the detected first change in status;
broadcasting the first notification generated by the peripheral device from the short-range wireless interface to multiple controllable camera devices within range of the peripheral device;
detecting a second change in status based on second data generated by a second sensor of the plurality of sensors, the second sensor different from the first sensor;
automatically generating a second notification in response to the detected second change in status, the second notification including second status information indicating the detected second change in status; and
broadcasting the second notification generated by the peripheral device from the short-range wireless interface to the multiple controllable camera devices within range of the peripheral device; wherein:
broadcasting the first notification comprises repeatedly broadcasting the first notification generated by the peripheral device;
broadcasting the second notification comprises repeatedly broadcasting the second notification generated by the peripheral device;
the first notification is different from the second notification; and
the peripheral device is one of a weapon peripheral device, a weapon holster peripheral device, and a vehicle monitor peripheral device.

17. The peripheral device of claim 16, wherein the operations further comprise:
while the peripheral device is repeatedly broadcasting the first notification, detecting a new change in status based on new data from a sensor of the plurality of sensors, wherein the new change in status supersedes the first change in status; and
in response to detecting the new change in status:
stopping the broadcasting of the first notification;
automatically generating a new notification in response to the detected new change in status, the new notification including new status information indicating the detected new change in status; and
broadcasting the new notification generated by the peripheral device from the short-range wireless interface to the multiple controllable camera devices within range of the peripheral device.

18. The peripheral device of claim 16, wherein the peripheral device comprises the vehicle monitor peripheral device and the plurality of sensors comprise a plurality of analog voltage sensors.

19. The peripheral device of claim 16, wherein:
automatically generating the first notification includes generating a first session identifier;
repeatedly broadcasting the first notification includes repeatedly broadcasting the first session identifier in the first notification;
automatically generating the second notification includes generating a second session identifier different from the first session identifier;
repeatedly broadcasting the second notification includes repeatedly broadcasting the second session identifier in the second notification.

20. A method of distributed control comprising:
detecting, by a peripheral device, a change in status based on first data generated by a sensor of the peripheral device;
automatically generating, by the peripheral device, a notification in response to the detected change in status, wherein the notification includes status information regarding the detected change in status;
broadcasting, by the peripheral device, the notification via a first short-range wireless interface of the peripheral device;
receiving, by a first controllable camera device, the notification from the peripheral device via a second short-range wireless interface of the first controllable camera device;
determining, by a first processor of the first controllable camera device, that a first configuration setting of the first controllable camera device should be changed in response to the status information;
changing, by the first controllable camera device, the first configuration setting of the first controllable camera device in response to the determining by the first processor that the first configuration setting of the first controllable camera device should be changed in response to the status information;

receiving, by a second controllable camera device, the notification via a third short-range wireless interface of the second controllable camera device;

determining, by a second processor of the second controllable camera device, that a second configuration setting of the second controllable camera device should be changed in response to the status information; and changing, by the second controllable camera device, the second configuration setting of the second controllable camera device in response to the determining by the second processor that the second configuration setting of the second controllable camera device should be changed in response to the status information, wherein:

changing the first configuration setting comprises starting video recording of first video data obtained by a first video sensor of the first controllable camera device;

changing the second configuration setting comprises starting video recording of second video data obtained by a second video sensor of the second controllable camera device;

the notification received by the second controllable camera device is retransmitted by one of the peripheral device and the first controllable camera device and received from the one of the peripheral device and the first controllable camera device; and the peripheral device is one of a weapon peripheral device, a weapon holster peripheral device, and a vehicle monitor peripheral device.

\* \* \* \* \*